(12) United States Patent
Sojak et al.

(10) Patent No.: US 10,589,343 B2
(45) Date of Patent: Mar. 17, 2020

(54) APPARATUS AND METHOD FOR FORMING AN ANTIPOLLUTION DEVICE HOUSING

(71) Applicant: GWS Tube Forming Solutions Inc., Bothwell (CA)

(72) Inventors: Richard Sojak, Wardsville (CA); James E. Kys, Appin (CA)

(73) Assignee: GWS Tube Forming Solutions Inc., Bothwell (CA)

( * ) Notice: Subject to any disclaimer, the term of this patent is extended or adjusted under 35 U.S.C. 154(b) by 189 days.

(21) Appl. No.: 15/276,299

(22) Filed: Sep. 26, 2016

(65) Prior Publication Data

US 2017/0232502 A1    Aug. 17, 2017

Related U.S. Application Data

(63) Continuation of application No. 14/732,910, filed on Jun. 8, 2015, now Pat. No. 9,481,025, which is a
(Continued)

(51) Int. Cl.
*F01N 3/28* (2006.01)
*B21J 9/06* (2006.01)
(Continued)

(52) U.S. Cl.
CPC .............. *B21K 21/16* (2013.01); *B21D 15/02* (2013.01); *B21D 22/025* (2013.01); *B21D 41/00* (2013.01);
(Continued)

(58) Field of Classification Search
CPC .... F01N 3/2853; F01N 2450/02; F01N 13/18; F01N 2450/20; F01N 2470/02;
(Continued)

(56) References Cited

U.S. PATENT DOCUMENTS

| 4,306,442 A | * | 12/1981 | Schrock | ................. B21D 41/04 29/237 |
| 4,472,959 A | * | 9/1984 | Fencl | ..................... B21D 41/04 72/402 |

(Continued)

*Primary Examiner* — David P Bryant
*Assistant Examiner* — Lawrence Averick
(74) *Attorney, Agent, or Firm* — Carlson, Gaskey & Olds, P.C.

(57) ABSTRACT

A tool assembly for forming a workpiece with an outer surface into a housing with a non-round design outer profile. The tool assembly includes a number of jaw segments, each jaw segment having an internal surface for engaging the outer surface. The jaw segments are movable between a first condition and a second condition, in which the internal surfaces of the jaw segments substantially define the design outer profile of the housing. Each internal surface has a preselected end point associated therewith defined by a radius centered on the preselected end point that is substantially coincident with the portion of the design outer profile defined by the internal surface. Each jaw segment is movable toward the preselected end point therefor when moved from the first condition to the second condition, and away from the preselected end point therefor when moved from the second condition to the first condition.

10 Claims, 26 Drawing Sheets

Related U.S. Application Data continuation of application No. 13/359,669, filed on Jan. 27, 2012, now Pat. No. 9,079,235, which is a continuation of application No. PCT/CA2010/001194, filed on Jul. 30, 2010.

(60) Provisional application No. 61/229,920, filed on Jul. 30, 2009.

(51) Int. Cl.
| | | |
|---|---|---|
| *B21D 41/04* | (2006.01) | |
| *B21D 41/00* | (2006.01) | |
| *B21K 21/16* | (2006.01) | |
| *B21D 51/10* | (2006.01) | |
| *B21D 15/02* | (2006.01) | |
| *B21D 22/02* | (2006.01) | |
| *B23P 15/00* | (2006.01) | |

(52) U.S. Cl.
CPC ............ *B21D 41/04* (2013.01); *B21D 51/10* (2013.01); *B21J 9/06* (2013.01); *B23P 15/00* (2013.01); *F01N 3/28* (2013.01); *F01N 3/2807* (2013.01); *Y10T 29/49398* (2015.01); *Y10T 29/53709* (2015.01)

(58) Field of Classification Search
CPC ........ F01N 3/2807; B01J 35/04; B23K 1/018; G05D 23/121; A61M 25/09; E04D 15/04; B25B 27/10; B21D 39/046; B21D 39/02; B21D 39/031; B21D 1/14; B21D 41/04; B21J 7/14; B21J 9/06; H01R 43/0424; H01R 43/0427
USPC ....... 72/292, 402, 416, 468, 370.23, 370.24; 29/890

See application file for complete search history.

(56) References Cited

U.S. PATENT DOCUMENTS

| | | | | |
|---|---|---|---|---|
| 4,738,013 A | * | 4/1988 | Yamashita | B23P 19/04 29/282 |
| 6,253,752 B1 | * | 7/2001 | Cox | F41B 5/0026 124/23.1 |
| 6,253,792 B1 | * | 7/2001 | Williams | B23P 19/04 138/177 |
| 6,317,976 B1 | * | 11/2001 | Aranda | F01N 3/2857 29/465 |
| 6,718,814 B2 | * | 4/2004 | Bartrom | B21J 7/14 72/402 |
| 8,281,636 B2 | * | 10/2012 | Mock | B21J 9/06 29/252 |
| 9,079,235 B2 | * | 7/2015 | Sojak | B21D 15/02 |
| 9,481,025 B2 | * | 11/2016 | Sojak | B21D 15/02 |
| 2002/0144531 A1 | * | 10/2002 | Bartrom | B21J 7/14 72/402 |
| 2002/0144532 A1 | * | 10/2002 | Bartrom | B21J 7/14 72/402 |
| 2006/0150382 A1 | * | 7/2006 | Martin | B23P 19/04 29/281.3 |
| 2007/0050978 A1 | * | 3/2007 | Topsoe | B21C 37/122 29/890 |
| 2010/0154215 A1 | * | 6/2010 | Umeda | B23P 11/005 29/890 |
| 2010/0300173 A1 | * | 12/2010 | Mock | B21J 9/06 72/316 |
| 2012/0137519 A1 | * | 6/2012 | Sojak | B21D 15/02 29/890.08 |
| 2015/0290698 A1 | * | 10/2015 | Sojak | B21D 15/02 29/890.08 |

\* cited by examiner

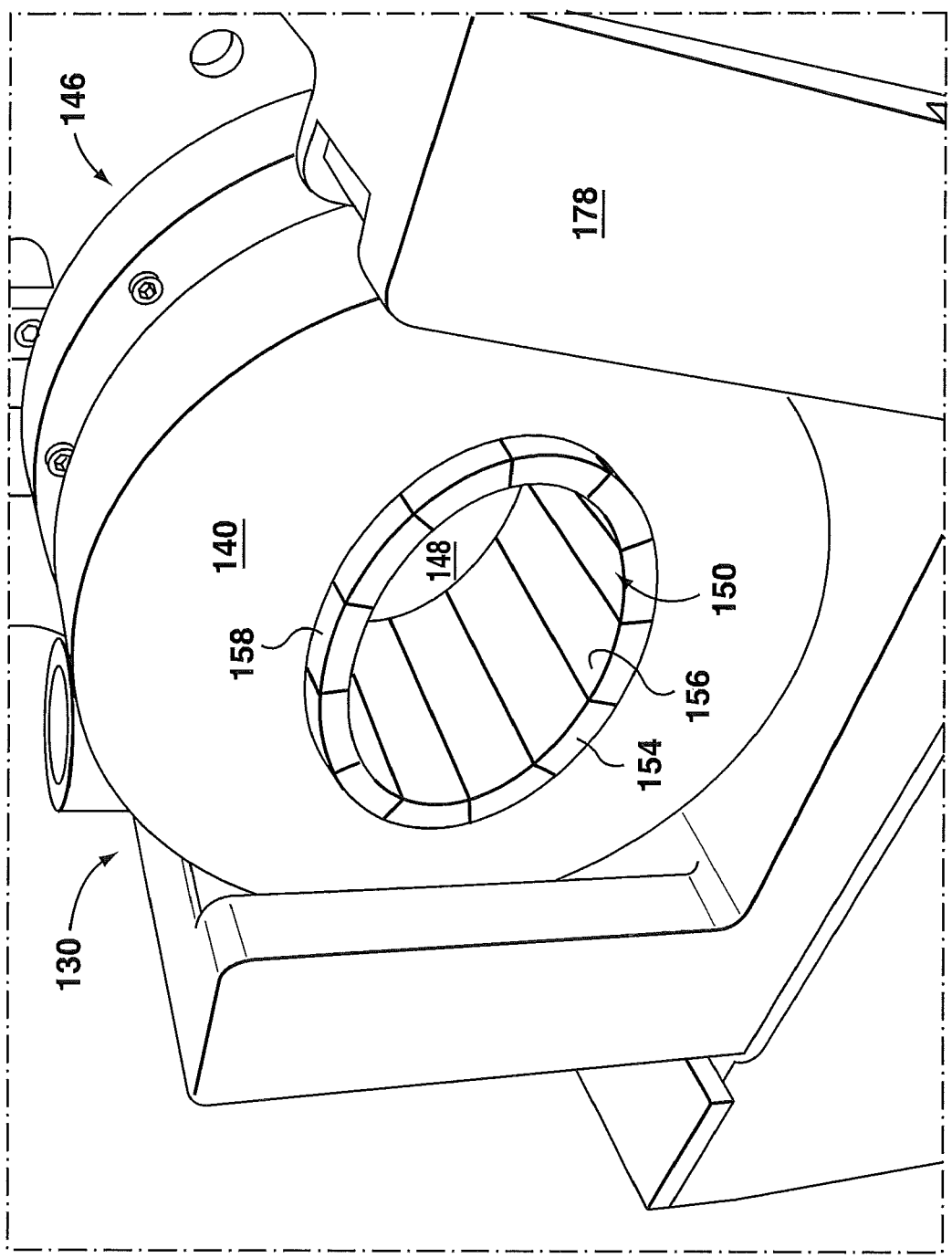

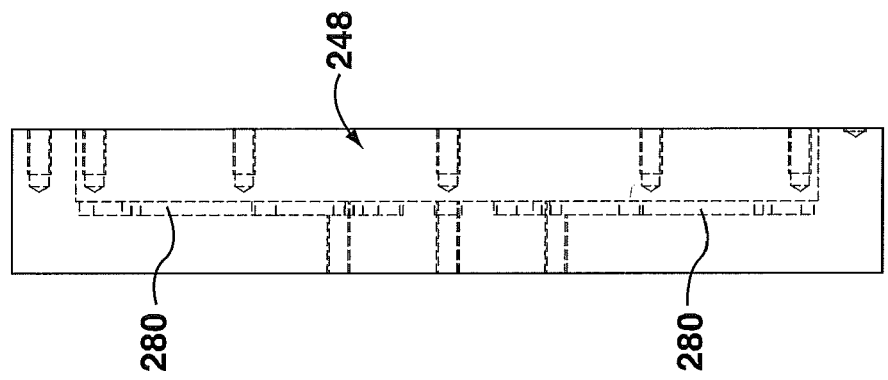
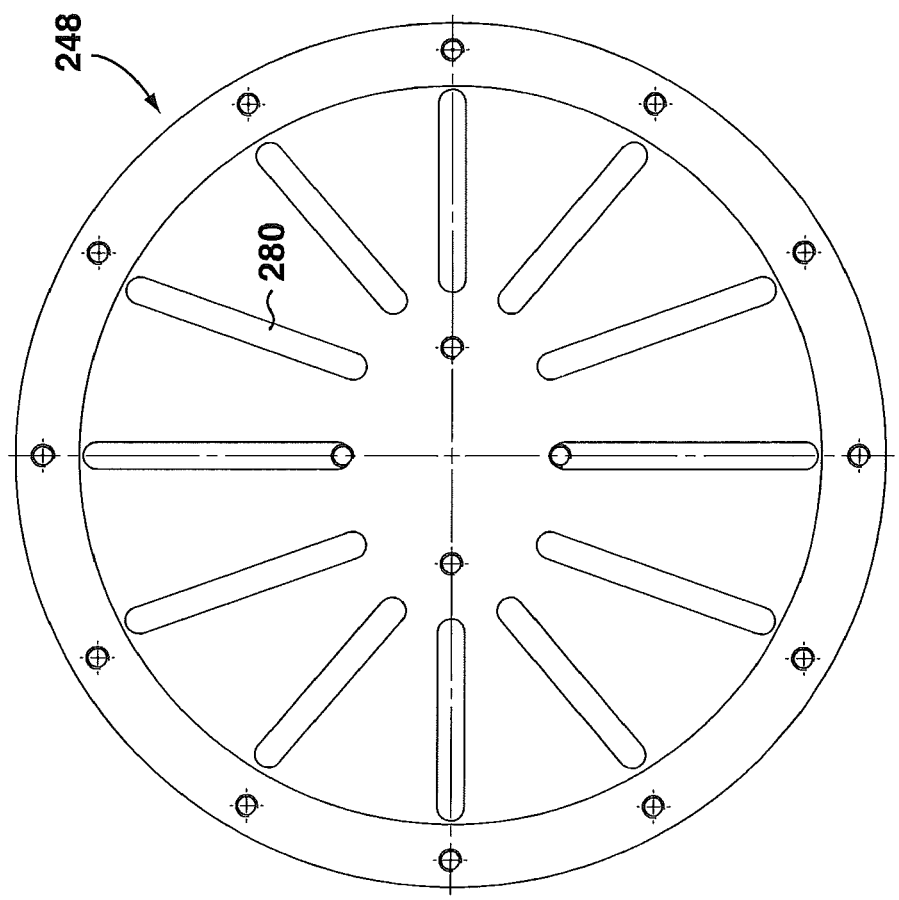

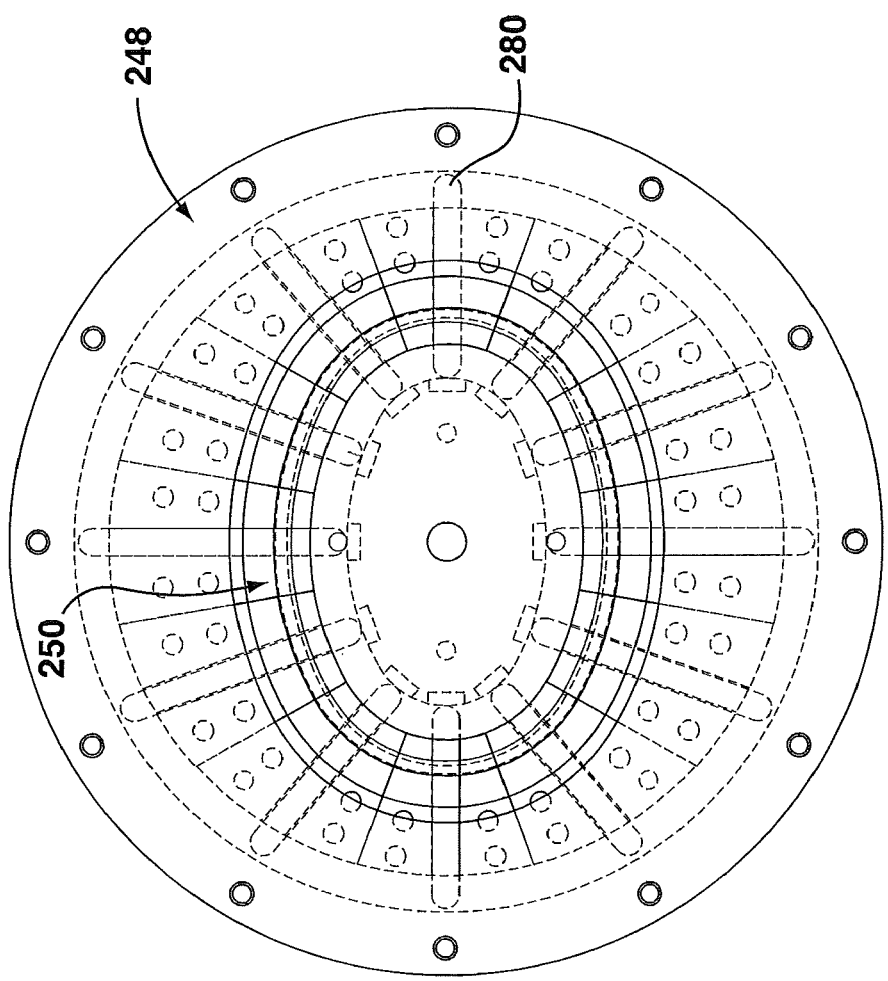

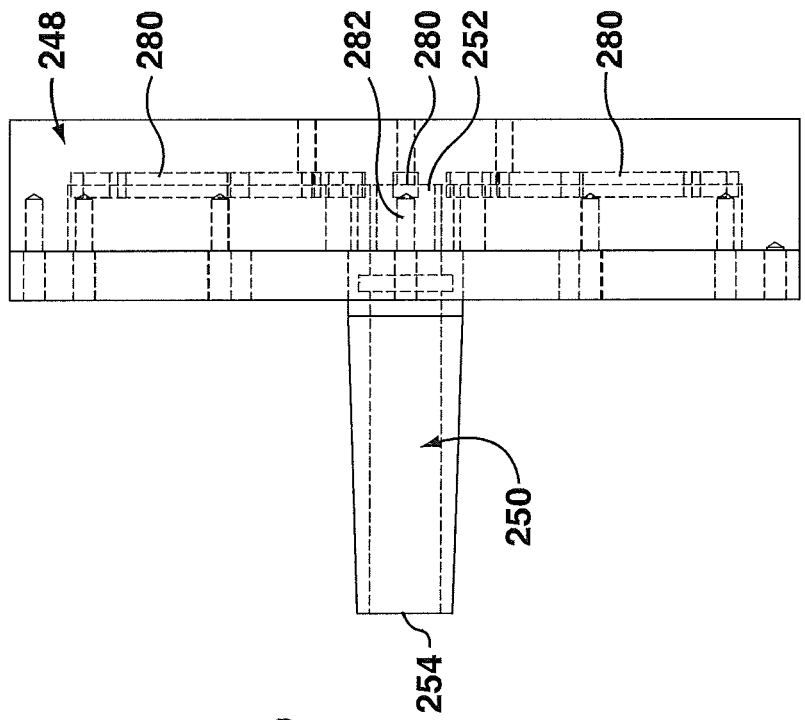
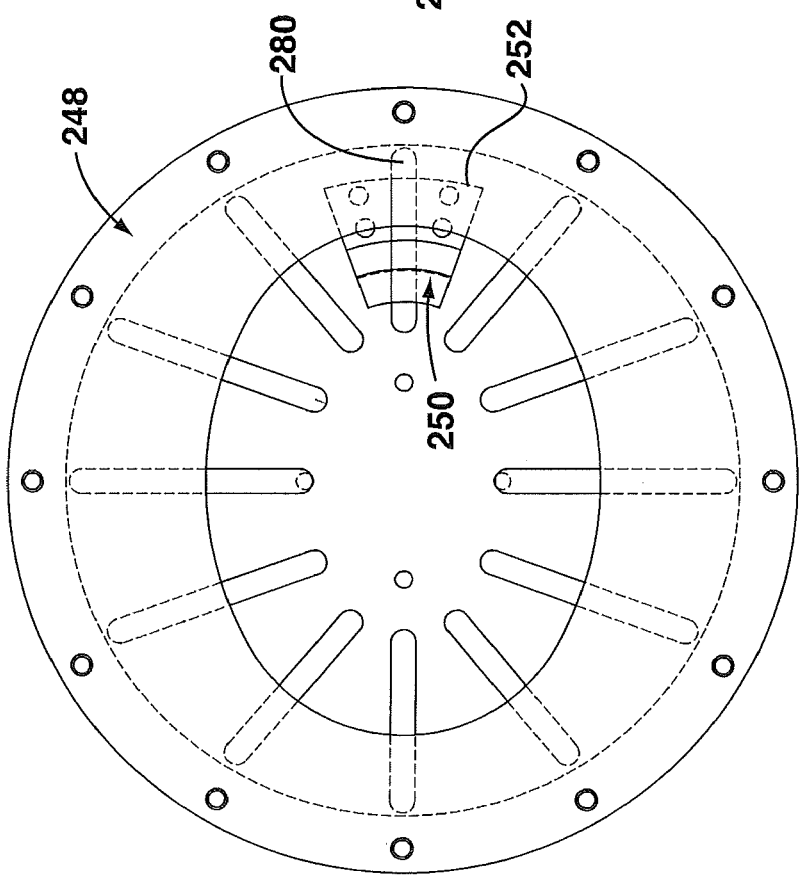
FIG. 12B
FIG. 12A

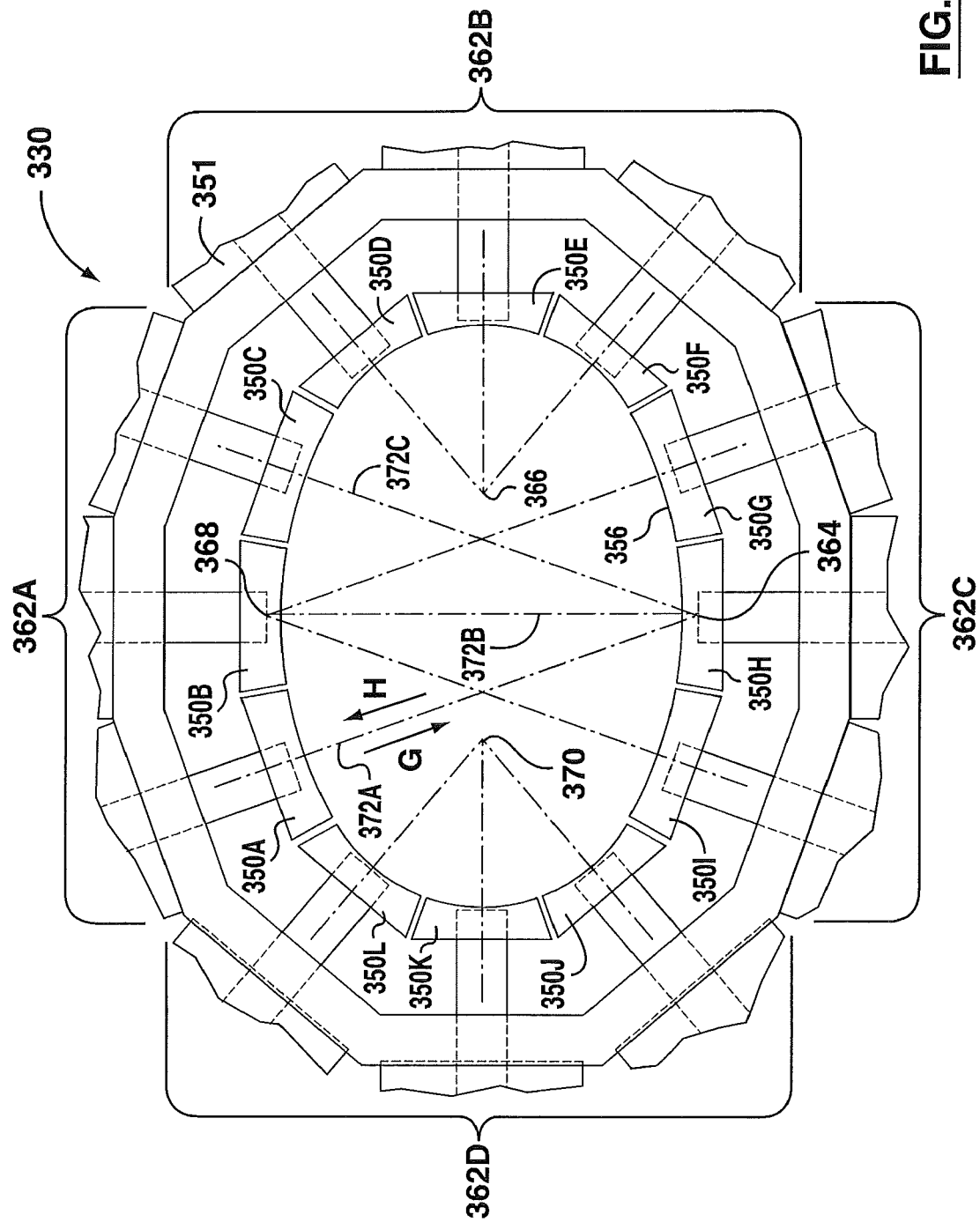

APPARATUS AND METHOD FOR FORMING AN ANTIPOLLUTION DEVICE HOUSING

This application is a continuation of U.S. application Ser. No. 14/732,910, which was a continuation of U.S. application Ser. No. 13/359,669, which was a continuation of International patent application no. PCT/CA2010/001194, filed on Jul. 30, 2010, which claims the benefit of U.S. Provisional Application No. 61/229,920, filed on Jul. 30, 2009, each of which is hereby incorporated by reference in its entirety.

FIELD OF THE INVENTION

The present invention is an apparatus and a method for forming an antipollution device housing.

BACKGROUND OF THE INVENTION

Various antipollution devices for use in automotive exhaust systems are known. Two common examples are the catalytic converter and the diesel particulate filter ("DPF"). Such known antipollution devices typically include housings in which certain components are positioned.

Within the main portion of the housing of a typical antipollution device is assembled a honeycomb-like structure (i.e., a "brick") most commonly made of a suitable ceramic substrate or similar material. (Other materials, e.g., stainless steel honeycombs, are also sometimes used as the substrate.) The brick provides a structure to which is applied various precious metals which act as the catalyst. The brick is a very fragile structure and is easily damaged, and because of this it is usually wrapped in a supportive, intumescent, mat inside the main portion of the housing. As is well known in the art, the main portion of the housing typically is sized to accommodate the brick and the mat therein, and the sizing of the housing is very important.

In general, the mat is critical to the overall performance of the antipollution device. The mat is required to seal the surfaces between the outer perimeter of the brick and the inner perimeter of the housing (i.e., in the main portion) to ensure that substantially all exhaust passes through the brick and is exposed to the catalyst, so that the undesired emissions are processed. In addition, the mat also imparts the proper forces within the housing to ensure the brick is not fractured due to excessive force, but is subjected to sufficient force to properly maintain and hold the brick in the correct position within the housing without slippage. As is well known in the art, according to design, the mat is to be compressed to a predetermined extent (e.g., so as to have a predetermined gap bulk density ("GBD")).

As is well known in the art, housings for antipollution devices are provided in a variety of shapes in cross-section. For example, in cross-section, the housings may have the following shapes: round, ovals, rectangles, squares, trapezoids, and many variations of such shapes, including irregular shapes. It is also known that antipollution device housings are often designed to receive a single brick, but alternatively are also often made with several bricks because of the performance requirements in a particular application.

A number of problems have arisen in connection with the known methods of manufacturing antipollution devices. The methods of the prior art have resulted in many failures due to inaccurate forming of the main portion and the transition portions in relation to the dimensions of the mat and the brick(s) which are assembled within the particular housing. For instance, if the housing is incorrectly formed too large, then the mat/brick subassembly slides in relation to the housing, resulting in damage to the brick and/or mat and, as a direct consequence, the immediate failure of the antipollution device when it is used. On the other hand, if the housing is sized too small or too tight, the antipollution device either cannot be assembled or the mat/brick subassembly is damaged during the assembly process, which typically results in impaired performance or failure of the antipollution device.

Various methods of assembling the brick and the mat in the housing are known in the art. For instance, it is known to provide a housing which is somewhat larger than required for a particular brick/mat subassembly. In this situation, the housing is formed from a workpiece which is reduced in size after the brick/mat assembly is positioned in the workpiece, to the required size and shape for the brick/mat subassembly. It is also known in the prior art to provide a housing which is required to be expanded in order to accommodate the brick/mat subassembly.

If the housing is properly formed to the correct dimensions of the individual brick/mat assembly, then the assembled antipollution device will satisfy the necessary GBD and/or other required inspection criteria. However, because the tolerance is relatively fine, even a small deviation from the required dimensions of the housing can result in an unacceptable assembly.

Depending on the variability of the brick and the mat, each housing may be required to be sized to unique and variable sizes based on the components that will be assembled within the housing. However, it is also known that, for a particular design, each shell may be reduced to substantially the same inner design dimensions, if the brick and the mat are manufactured to suitable tolerances.

In the prior art, where a shell has a non-round profile (e.g., oval) and the workpiece is required to be reduced by more than approximately 2 millimeters, the shell is not satisfactorily formed. This is because, in the prior art, the tool segments are moved toward a common center as the workpiece is formed into the shell (FIG. 1A). However, in the prior art, the tool segments (or jaw segments) are not movable at a uniform rate (i.e., the prior art jaw segments do not engage the workpiece substantially simultaneously), resulting in ridges (not shown) in the shell when the size reduction is greater than about 2 millimeters. Because many designs now require far more than a 2 millimeter reduction, this means that the shell or housing is often not satisfactorily formed.

In the prior art, the housing is often formed in a process in which at least two, and sometimes three or more different machine heads are used in an attempt to address this problem, i.e., in an attempt to ensure that each housing is appropriately formed. Using this many machines involves a relatively high unit expense and also requires time to be spent in the manufacturing process moving the workpiece between machines. Also, the use of multiple machines has not necessarily resulted in satisfactory reduction of the non-round profile by 2 millimeters or more.

A typical prior art tool assembly 20 to be used for reduction of a non-round profile by 2 millimeters or more is shown in FIGS. 1A-1D. (As will be described, the remainder of the drawings illustrate the present invention.) As is well known in the art, the tool assembly 20 typically includes a ring portion 17 with a round tapered inner bore therein defined by an inner surface 19 and an inner segmented subassembly 21 including a number of jaw segments 22. However, where the workpiece is reduced by 2 millimeters or more to form the non-round housing, the prior art tool assembly 20 has often provided unsatisfactory results, as described above.

As can be seen in FIGS. 1C and 1D, the jaw segments 22, when in an engaged condition (as shown in FIGS. 1A-1D), define a substantially oval design profile 24. As is well known in the art, internal surfaces 26 of the jaw segments 22 engage an outer surface of a workpiece (not shown in FIGS. 1A-1D) as the jaw segments move inwardly, each jaw segment 22 moving as indicated by the arrows "A" toward a common center "X" (FIG. 1C). The converging and forward movement of the jaw segments results from movement of a back plate (not shown) on which the jaw segments 22 are mounted toward the ring portion (FIGS. 1A, 1B) with the substantially round tapered bore therein. Also, the convergence during the forward movement of the jaw segments results from engagement of tapering side surfaces 28 (FIG. 1D) with the inner surface (not shown) defining the round hole in the ring portion, as the back plate is moved toward the ring portion.

As noted above, in practice, the prior art tool assembly generally does not provide a satisfactory housing with a non-round profile. The housing resulting from this processing typically has small ridges thereon. This defect appears to be due to each of the jaws having a slightly different geometry, but each also being urged inwardly by an inner surface of the ring portion which is round in cross-section, toward a common center.

SUMMARY OF THE INVENTION

For the foregoing reasons, there is a need for an improved method and apparatus for making housings for antipollution devices which address or mitigate one or more of the defects of the prior art. In particular, the apparatus of the invention provides for substantially simultaneous engagement by jaw segments of substantially the entire outer surface of the workpiece.

In its broad aspect, the invention provides a tool assembly for forming a workpiece with an outer profile at least partially defined by an outer surface thereof at an initial position into a housing with a non-round design outer profile at least partially defined by the outer surface at a design position reduced from the initial position thereof. The tool assembly includes a number of jaw segments, each jaw segment having an internal surface for engaging the outer surface. The jaw segments are movable between a first condition, in which an opening is defined in which the workpiece is receivable, and a second condition, in which the internal surfaces of the jaw segments substantially define the design outer profile of the housing, each internal surface defining a respective portion of the design outer profile. Each internal surface has a preselected end point associated therewith defined by a radius centered on the preselected end point that is substantially coincident with the portion of the design outer profile defined by the internal surface, the internal surfaces being respectively associated with a number of preselected end points. Each jaw segment is movable along a predetermined path therefor, when moved from the first condition to the second condition, toward the preselected end point therefor, and when moved from the second condition to the first condition, away from the preselected end point therefor. The tool assembly also includes one or more motive means for moving the jaw segments between the first and second conditions.

In one of its aspects, the motive means is a number of hydraulic cylinders, each hydraulic cylinder being configured to move a selected one of the jaw segments.

In another aspect, the hydraulic cylinders are controlled for substantially simultaneous engagement of the jaw segments with the workpiece to form the housing.

In another aspect, the invention provides a method of forming a workpiece with an outer profile at least partially defined by an outer surface thereof at an initial position into a housing with a non-round design outer profile at least partially defined by the outer surface at a design position reduced from the initial position thereof. The method includes providing a number of jaw segments, each jaw segment having an internal surface for engaging the outer surface. The jaw segments are movable between a first condition, in which an opening is defined in which the workpiece is receivable, and a second condition, in which the internal surfaces of the jaw segments substantially define the design outer profile of the housing, each internal surface defining a respective portion of the design outer profile. Each internal surface has a preselected end point associated therewith defined by a radius centered on the preselected end point that is substantially coincident with the portion of the design outer profile defined by the internal surface thereof, the internal surfaces being respectively associated with a number of preselected end points. Each jaw segment being movable along a predetermined path therefor, when moved from the first condition to the second condition, toward the preselected end point therefor, and when moved from the second condition to the first condition, away from the preselected end point therefor. One or more motive means is provided for moving the jaw segments between the first and second conditions. The jaw segments are moved to the first condition. The workpiece is inserted into the opening. Using the motive means, the jaw segments are moved from the first condition to the second condition to form the workpiece into the housing.

In another aspect, the motive means includes a number of hydraulic cylinders, each hydraulic cylinder being configured to move a selected one of the jaw segments.

In yet another aspect, in step (e), the hydraulic cylinders are controlled to cause the jaw segments to engage the outer surface substantially simultaneously when moving from the first condition to the second condition.

BRIEF DESCRIPTION OF THE DRAWINGS

The invention will be better understood with reference to the attached drawings, in which:

FIG. 6E is another isometric view of the tool assembly of FIG. 6C, in which the jaw segments are in a second condition;

FIG. 10A is a front view of the back plate of FIG. 6F, drawn at a smaller scale;

FIG. 10B is a side view of the back plate of FIG. 10A;

FIG. 11 is a front view of an embodiment of an alternative embodiment of the insert portion of the invention;

FIG. 12A is a front view of the back plate of FIG. 6F with a jaw segment positioned thereon, drawn at a smaller scale;

FIG. 12B is a side view of the back plate and jaw segment of FIG. 12A;

FIG. 13B is a front view of a portion of the tool assembly of FIG. 13A, drawn at a larger scale;

DETAILED DESCRIPTION

Figure 8B:
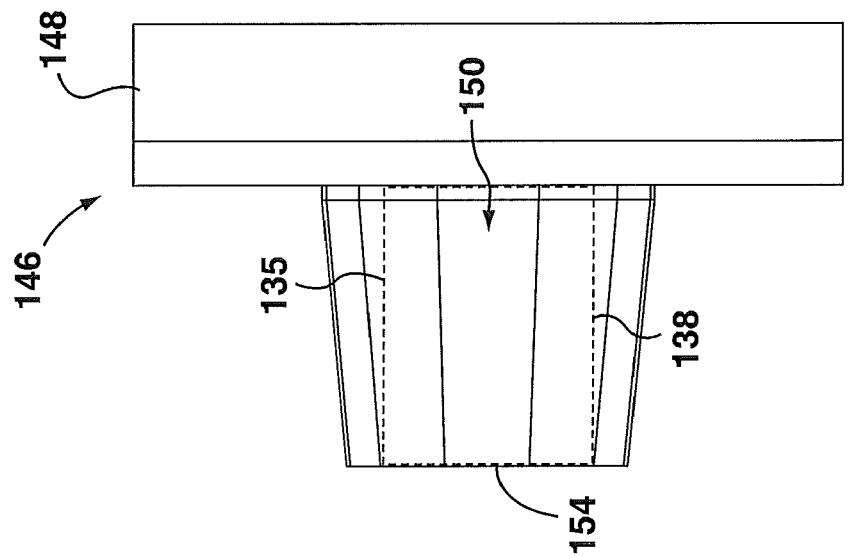
FIG. 8B is a side view of the insert portion of FIG. 8A.
Figure 8A:
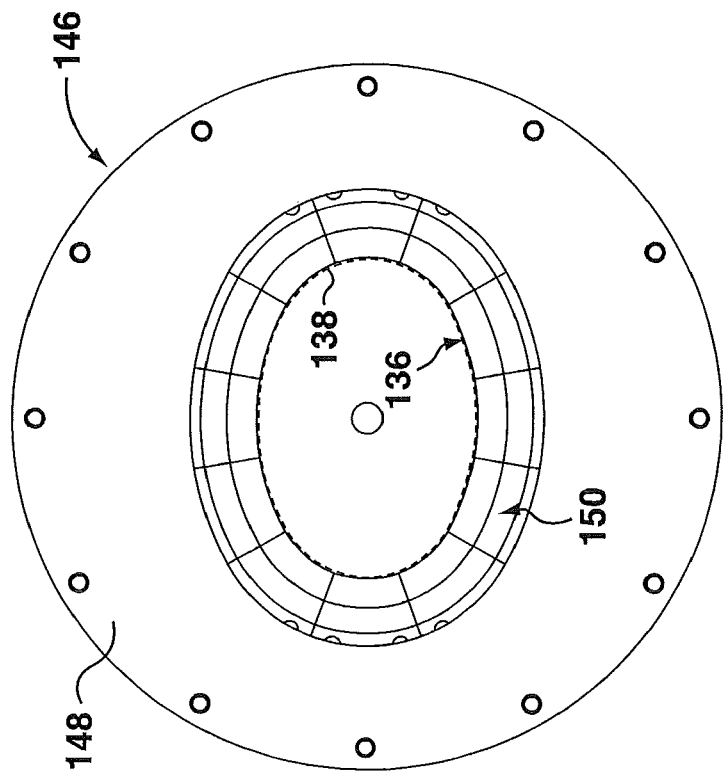
FIG. 8A is a front view of the insert portion of FIG. 7A, in which the jaw segments are in the second condition.
Figure 9B:
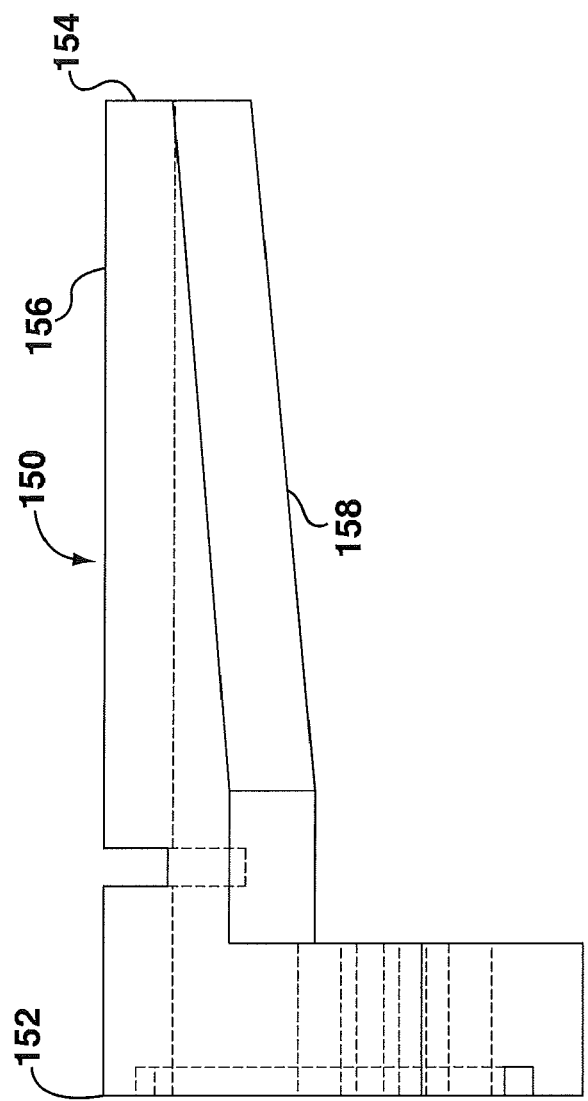
FIG. 9B is a side view of the jaw segment of FIG. 9A.
Figure 9A:
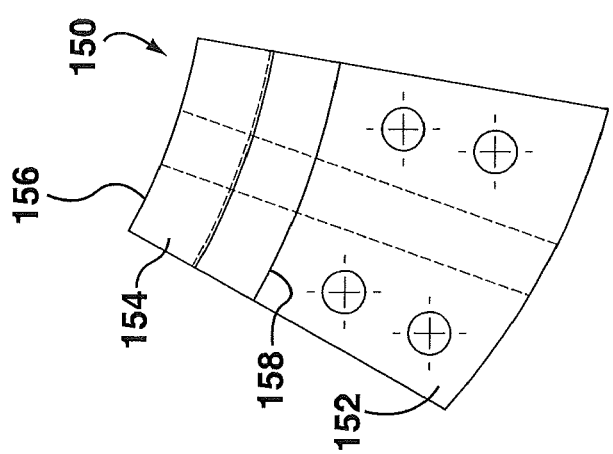
FIG. 9A is a top view of an embodiment of a jaw segment of the invention, drawn at a larger scale.

In the attached drawings, like reference numerals designate corresponding elements throughout. Reference is first made to FIGS. 2A-6E and 7A-9C to describe an embodiment of a tool assembly in accordance with the invention indicated generally by the numeral 130. The tool assembly 130 (FIG. 4) is for forming a workpiece 132 with an initial outer profile 134 (FIGS. 3, 7A, 7B) at least partially defined by an outer surface 135 thereof at an initial position (FIGS. 3, 7A) into a housing 136 having a non-round design outer profile 138 (FIGS. 3, 8A, 8B) at least partially defined by the outer surface 135 at a design position (FIGS. 3, 8A) reduced from the initial position thereof. The tool assembly 130 preferably includes a ring portion 140 having a bore 142 therein at least partially defined by an inner surface 144 (FIG. 6B). It is also preferred that the tool assembly 130 includes an insert portion 146 having a back plate 148 and a number of elongate jaw segments 150. Each jaw segment 150 extends between a back end 152 thereof engaged with the back plate 148 and a front end 154 thereof distal to the back plate 148 (FIGS. 9A, 9B). As can be seen in FIGS. 9A and 9B, each jaw segment 150 includes an internal surface 156 for engaging the outer surface 135 and an at least partially tapered external surface 158 for sliding engagement with the inner surface 144 of the ring portion 140, as will be described. The jaw segments 150 preferably are movable between a first condition (FIGS. 7A, 7B), in which the internal surfaces 156 of the jaw segments 150 at least partially define an opening 160 in which the workpiece 132 is receivable, and a second condition (FIGS. 6E, 8A, 8B), in which the internal surfaces 156 of the jaw segments 150 substantially define the design position of the outer surface 135 (FIGS. 8A, 8B). Preferably, the jaw segments 150 are at least partially receivable in the bore 142 of the ring portion 140, as will also be described. In one embodiment, the insert portion 146 preferably is movable relative to the ring portion 140 between an open condition of the tool assembly (FIG. 6D), in which the back plate 148 is positioned distal to the ring portion 140, and a closed condition of the tool assembly (FIGS. 4, 5), in which the back plate 148 is positioned proximal to the ring portion 140. When the insert portion 146 moves from the open condition to the closed condition, the inner surface 144 of the ring portion 140 urges the jaw segments 150 inwardly (i.e., in the direction indicated by arrows "K" in FIG. 9C) from the first condition to the second condition, causing the jaw segments 150 to engage substantially the entire outer surface 135 and to move the outer surface 135 from the initial position to the design position, reducing the initial outer profile 134 to the design outer profile 138, and forming the workpiece 132 into the housing 136.

Those skilled in the art would appreciate that, after the housing 136 is formed (i.e., usually with the brick and mat therein, as described below), the insert portion 146 preferably moves from the closed condition to the open condition. It is also preferred that, as the insert portion 146 moves to the open condition, the jaw segments 150 move outwardly from the second condition to the first condition. As the jaw segments 150 move to the first condition, the internal surfaces 156 of the jaw segments 150 are released from engagement with the outer surface 135. The housing 136 is then removable from the opening 160. After the just-formed housing 136 is removed, a new workpiece 132 is then positioned in the opening 160, and the process is repeated.

Figure 1B:
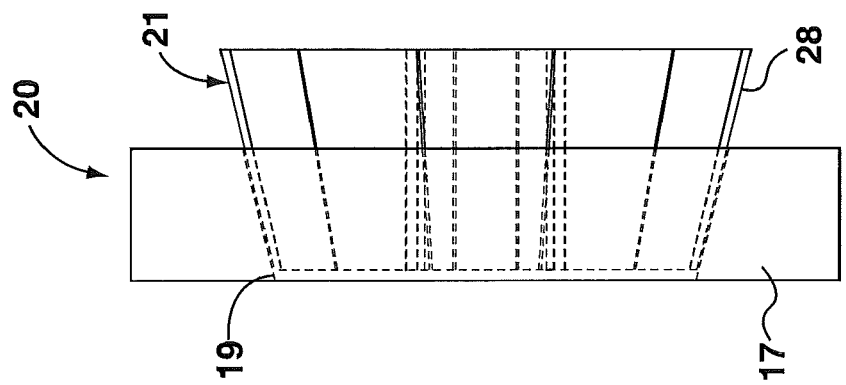
FIG. 1B (also described previously) is a side view of the tool assembly of FIG. 1A.
Figure 1A:
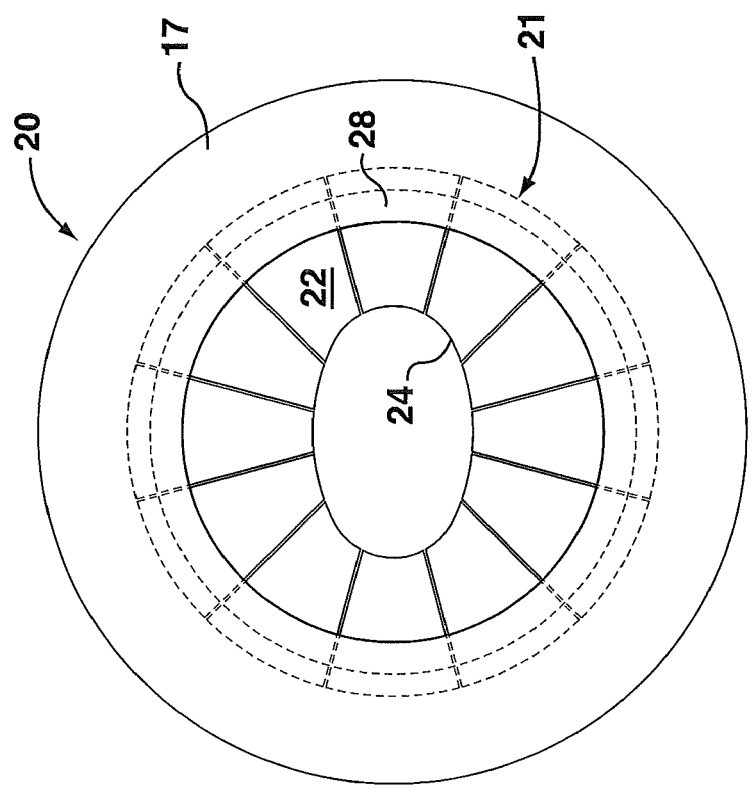
FIG. 1A (also described previously) is a front view of a tool assembly of the prior art.
Figure 1D:
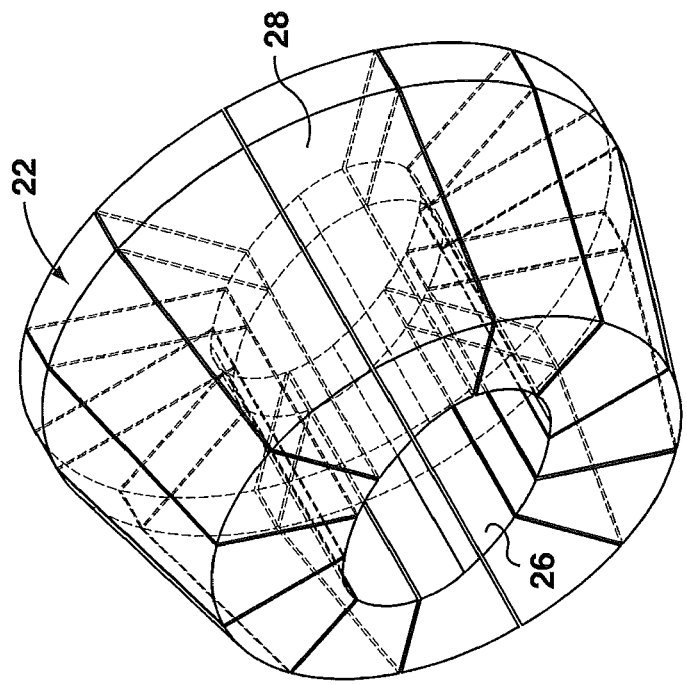
FIG. 1D (also described previously) is an isometric view of the jaw segments of FIGS. 1A-1C.
Figure 1C:
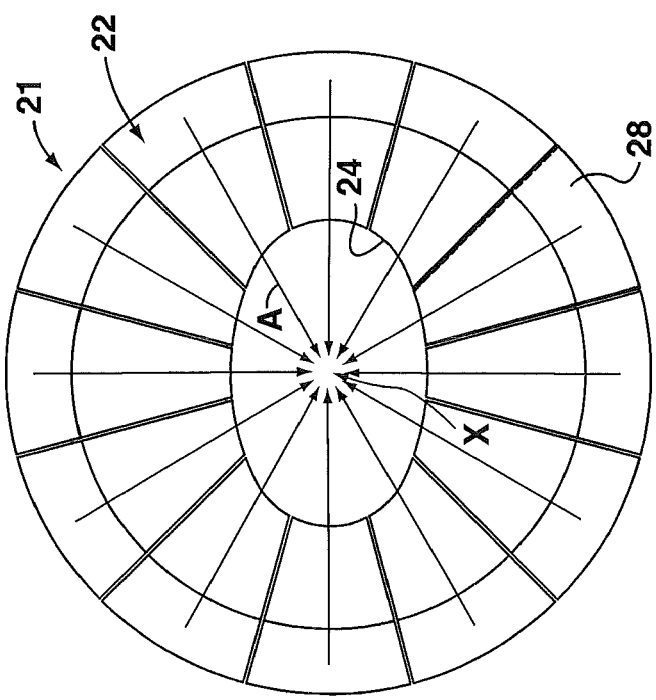
FIG. 1C (also described previously) is a front view of the jaw segments of FIG. 1A, drawn at a larger scale.
Figure 2A:
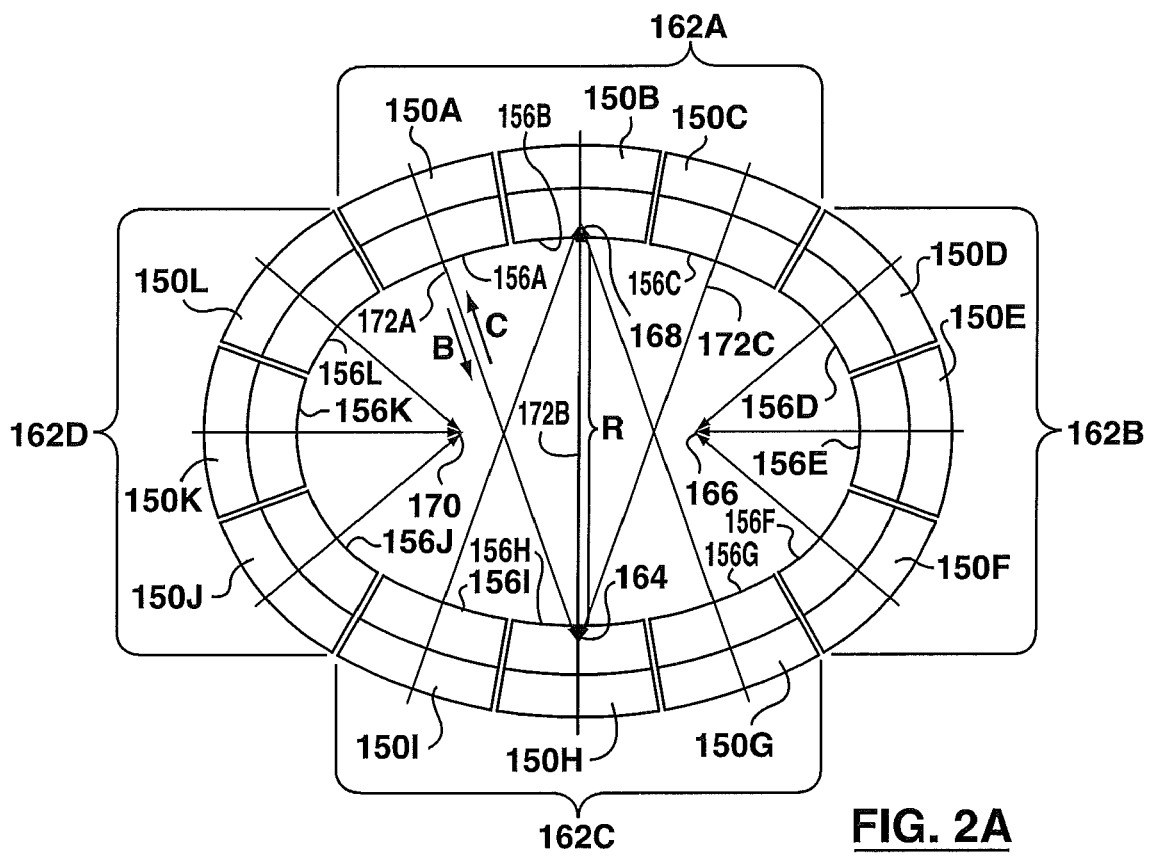
FIG. 2A is a front view of an embodiment of a jaw segment subassembly of the invention.
Figure 2B:
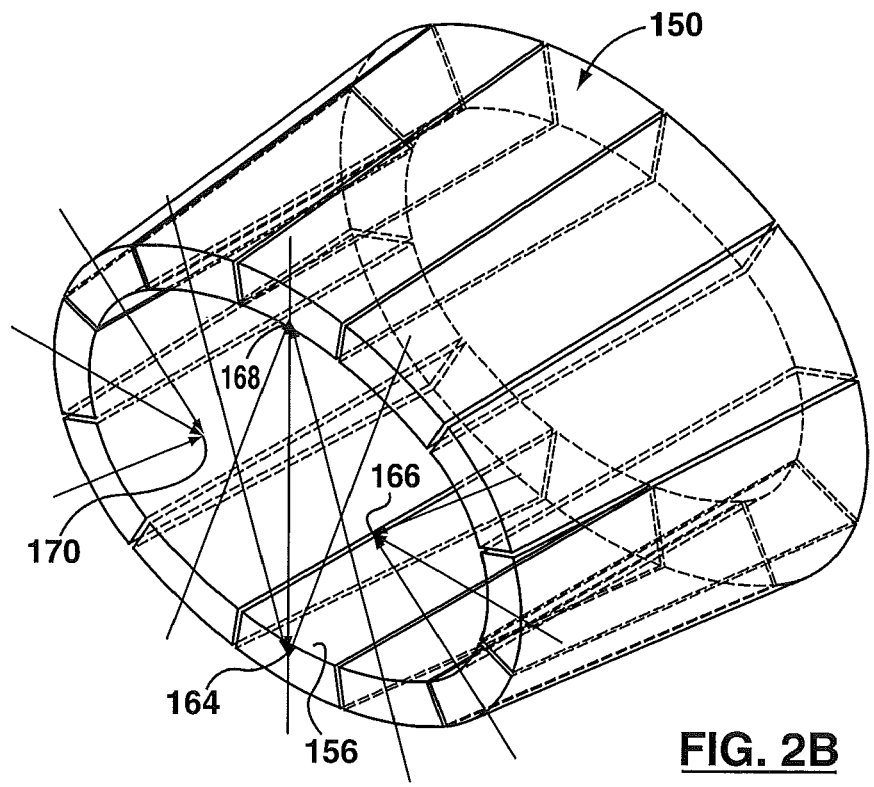
FIG. 2B is a an isometric view of the jaw segment subassembly of FIG. 2A.

As will also be described, in one embodiment, movement of the jaw segments 150 from the first condition toward the second condition preferably causes substantially uniform movement of substantially the entire outer surface 135. As shown in FIGS. 2A and 2B, the jaw segments 150 preferably are moved along substantially straight predetermined paths as the jaw segments 150 are moved from the first condition to the second condition, the predetermined paths being aligned with preselected end points. In addition, as the jaw segments are moved from the second condition to the first condition, each jaw segment moves in the opposite direction, along the same substantially straight path respectively.

For example, the design outer profile 138 for which the jaw segments 150 shown in FIGS. 2A and 2B are designed is an oval. As can be seen in FIG. 2A, the jaw segments 150 are formed to be arranged in four groups 162A-162D of three jaw segments each. For convenience, the jaw segments are identified in FIG. 2A as jaw segments 150A-150L. As can be seen in FIG. 2A, in this example, jaw segments 150A-150C are included in a group (designated 162A) of three jaw segments which travel along substantially straight paths directed to a common focus (or common preselected end point) 164. Similarly, the jaw segments 150D-150F are in a group 162B moving along paths directed toward a common focus (preselected end point) 166. The jaw segments 150G-150I are in a group 162C and are adapted to move along paths toward a common focus (preselected end point) 168. The jaw segments 150J-150L are in a group 162D adapted to move along paths towards a common focus (preselected end point) 170.

As shown in FIG. 2A, each jaw segment 150 moves along its respective substantially straight path. For example, the jaw segment 150A moves along the path 172A toward the preselected end point 164 (i.e., in the direction indicated by arrow "B") when the jaw segments are moving from the first condition to the second condition. It will be understood that, when the jaw segments are moving from the second condition to the first condition (e.g., after the housing 136 has been formed), the jaw segment 150A moves along the path 172A in the opposite direction (i.e., in the direction indicated by arrow "C"), away from the preselected end point 164.

The other jaw segments 150B, 150C in group 162A move along different paths (identified as 172B and 172C respectively in FIG. 2A). However, as shown in FIG. 2A, all three jaw segments 150A-150C move toward the same preselected end point 164 when the jaw segments are moving from the first condition to the second condition, and all three jaw segments 150A-150C move away from the same preselected end point 164 when the jaw segments are moving from the second condition to the first condition. It can be seen from FIG. 2A that the jaw segments in the other groups 162B-162D also move along respective paths which are to or from each group's preselected end point respectively. In each case, the predetermined paths for the jaw segments in a particular group converge at the preselected end point. Preferably, the jaw segments in a group are positioned adjacent to each other, as can be seen in FIG. 2A.

In FIG. 2A, the jaw segments are shown in the second condition. (It will be understood that the gaps between the jaw segments as illustrated in FIG. 2A are exaggerated for clarity of illustration.) Accordingly, the internal surfaces 156A-156L of the jaw segments in a group 162 substantially define a portion of the design outer profile 138. The portion is a part of an arc. Preferably, a radius "R" centered on the preselected end point of a selected one of the groups is substantially coincident with a portion of the design outer profile that is defined by the internal surfaces of the jaw segments in the selected one of the groups, when the jaw segments are in the second condition.

For instance, the internal surfaces 156A-156C substantially define a portion of the design outer profile 138. The radius R, being the line 172B between the preselected end point 164 and the internal surface 156B (as illustrated in FIG. 2A), is centered on the preselected end point 164 and is coincident with the internal surfaces 156A-156C, being the internal surfaces for the jaw segments 150A-150C in the group 162A, which is associated with the preselected end point 164. As can be seen in FIG. 2A, for the other groups 162B-162D, the radius centered on the preselected end point for each group respectively is substantially coincident with the portion of the design outer profile 138 that is substantially defined by the internal surfaces of the jaw segments in each respective group.

Figure 3:
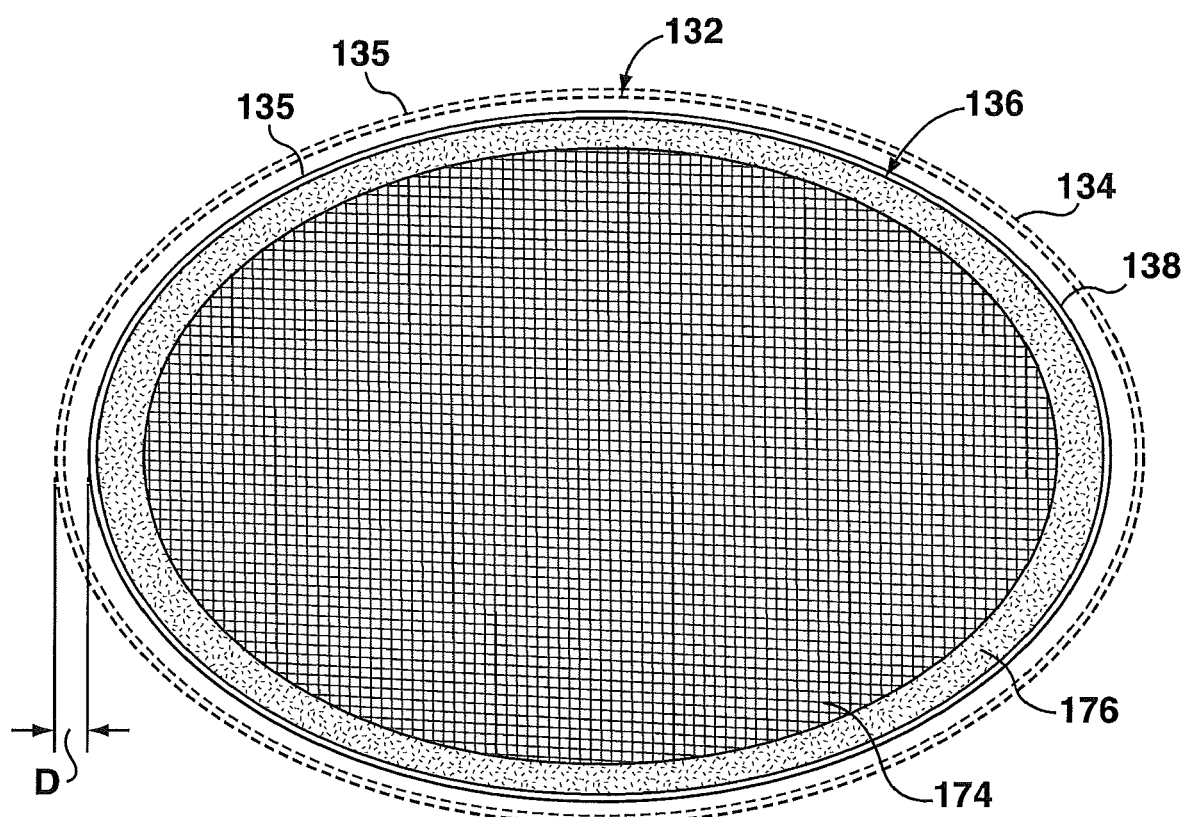
FIG. 3 is a front view of a housing with a brick and a mat positioned therein, drawn at a larger scale.

The workpiece 132 is shown in dashed outline in FIG. 3, positioned to correspond to the housing 136 (with a brick 174 and a mat 176 therein) formed from the workpiece 132. The extent to which the outer profile 34 is reduced to become the design outer profile 138 is identified in FIG. 3 as "D". In practice, the distance D may be between approximately 2 millimeters and approximately 10 millimeters. As well, in the invention herein, only one machine (i.e., the tool assembly 130 of the invention) is required to achieve the reduction.

Figure 4:
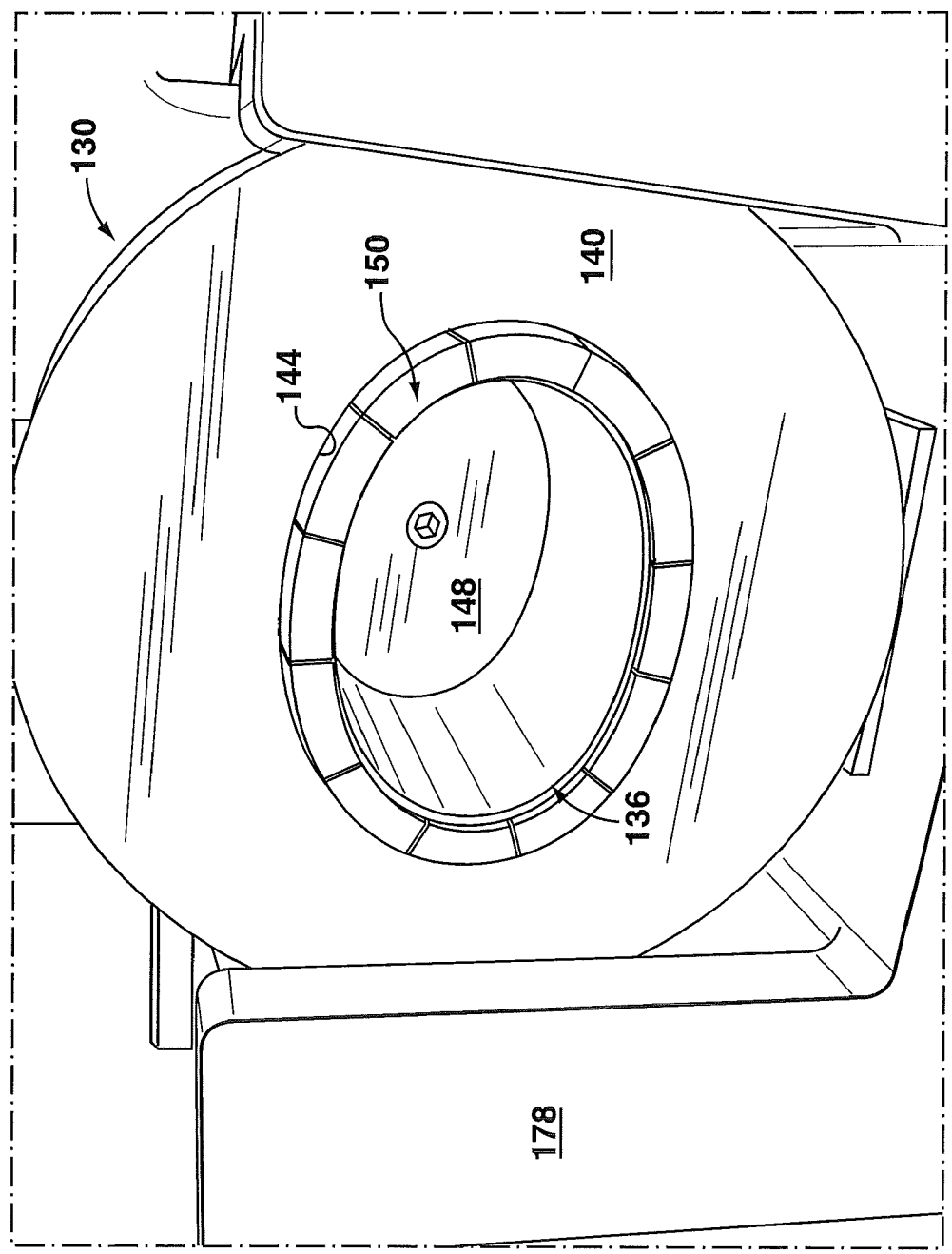
FIG. 4 is an isometric view of an embodiment of the tool assembly of the invention in which the jaw segments are shown in an engaged condition engaging an outer surface, drawn at a smaller scale.
Figure 5:
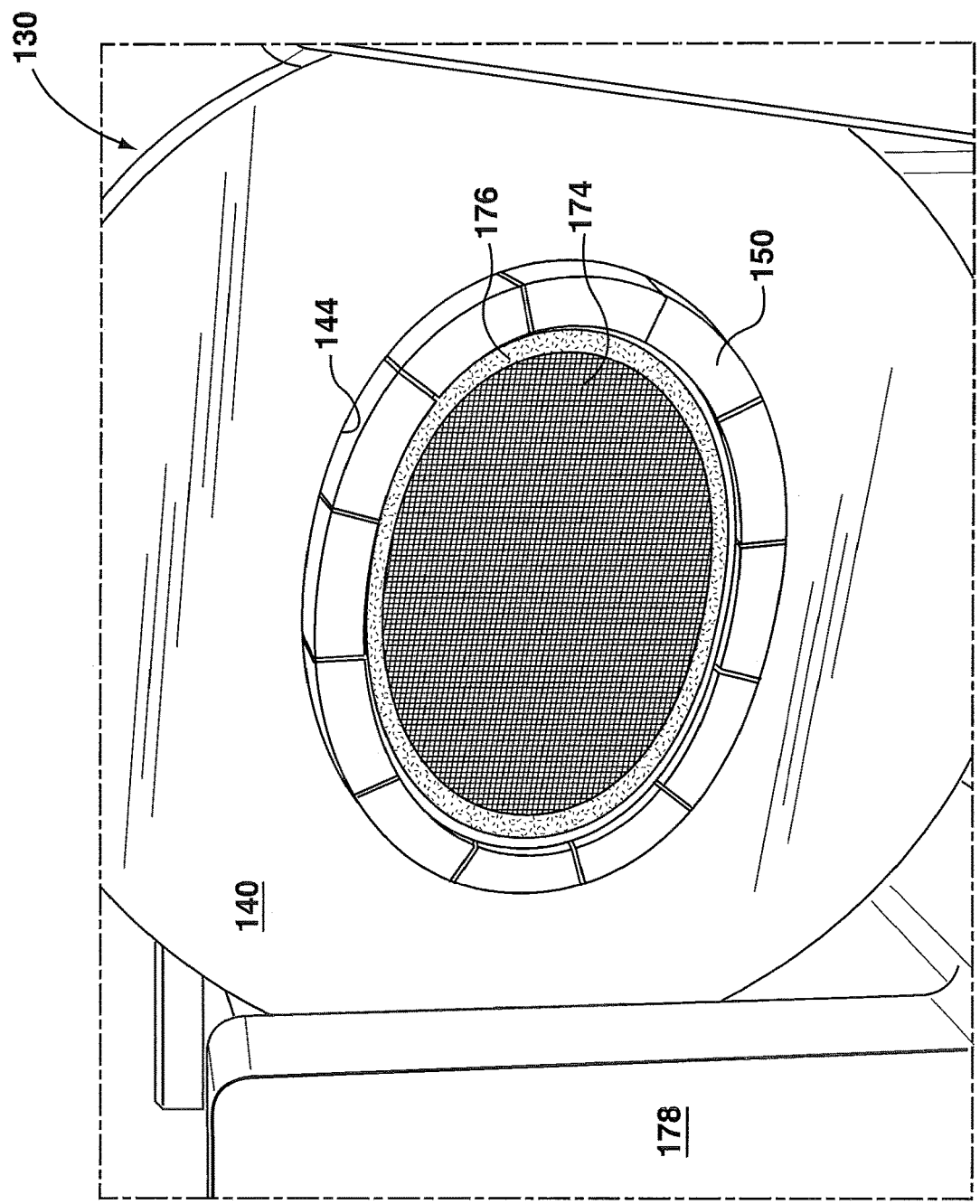
FIG. 5 is an isometric view of the tool assembly of FIG. 4 showing a brick and a mat positioned in the housing.
Figure 6A:
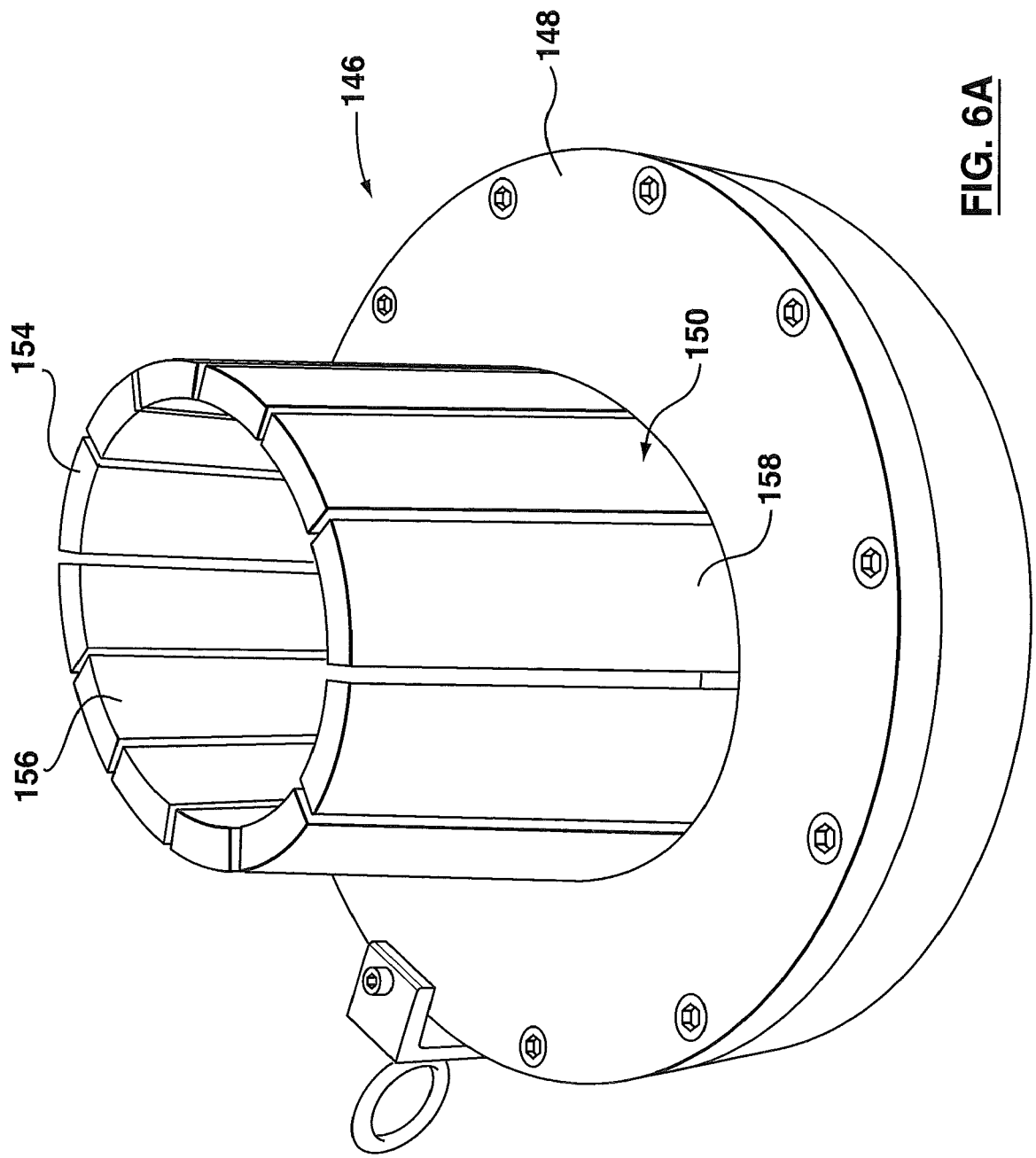
FIG. 6A is an isometric view of an embodiment of an insert portion of the invention with the jaw segments therein in a first condition, drawn at a larger scale.
Figure 6B:
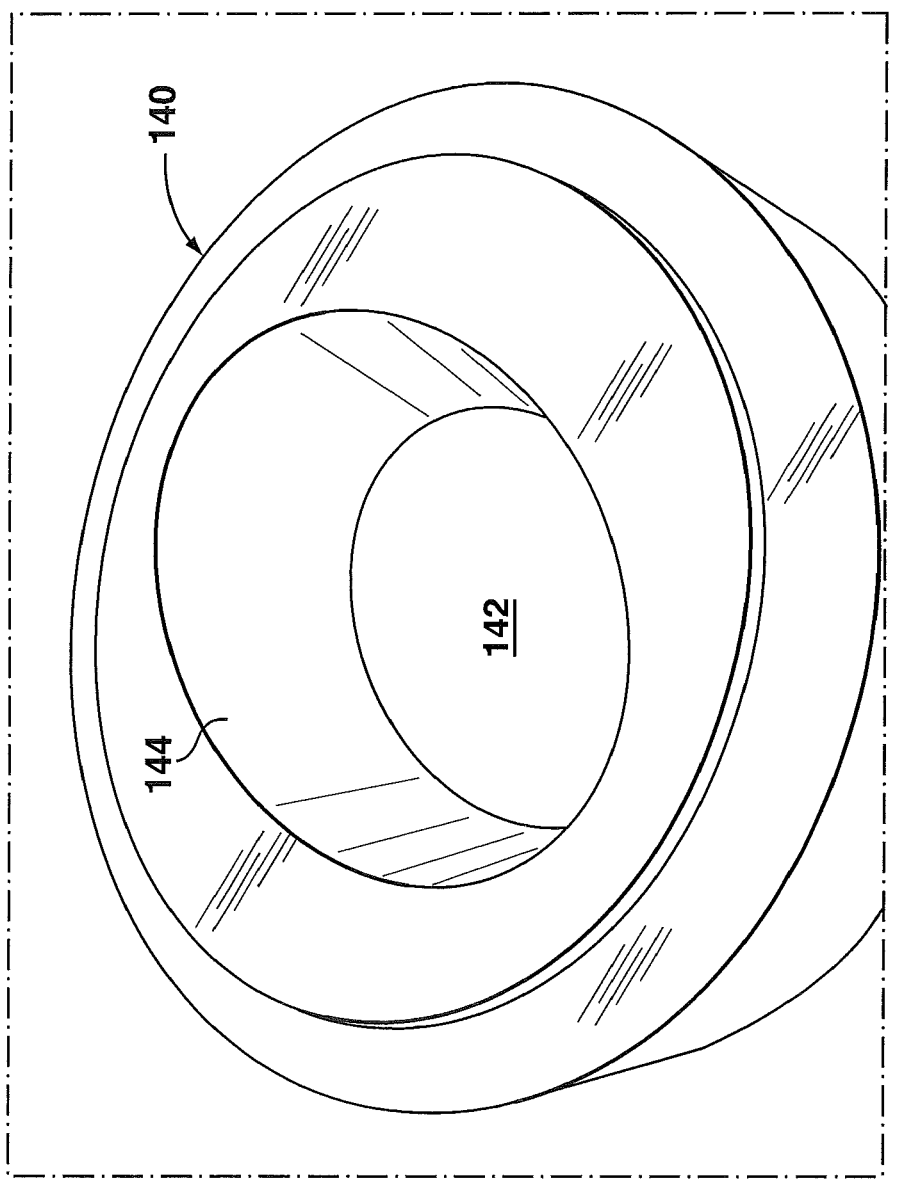
FIG. 6B is an isometric view of an embodiment of a ring portion of the invention.

As can be seen, for instance, in FIGS. 4 and 5, it is preferred that substantially the entire outer surface 135 is engaged by the internal surfaces of the jaw segments. It can also be seen in FIG. 3 that the initial outer profile is offset outwardly from the design outer profile by a predetermined distance D. Because the jaw segments are moved uniformly inwardly as the jaw segments are moved from the first condition to the second condition, the movement of the outer surface 135 from the initial position to the design position is substantially uniform. Accordingly, due to the engagement of substantially the entire outer surface 135 by the internal surfaces 156 of the jaw segments 150 of the invention, the outer surface 135 is reduced from the initial position to the design position without "ridges" developing on the outer surfaces between individual jaw segments. It has been found that such reduction is made even where the reduction distance D is 2 millimeters or more.

As can be seen in FIGS. 4, 5, 6C, 6D, and 6E, in one embodiment, the insert portion 146 and the ring portion 140 preferably are positioned in a frame 178 in which movement of the insert portion 146 relative to the ring portion 140 is permitted. The manner in which the insert portion 146 and the ring portion 140 are mounted in the frame 178 would be known to those skilled in the art, and it is therefore unnecessary to describe the frame 178 in detail.

Figure 9C:
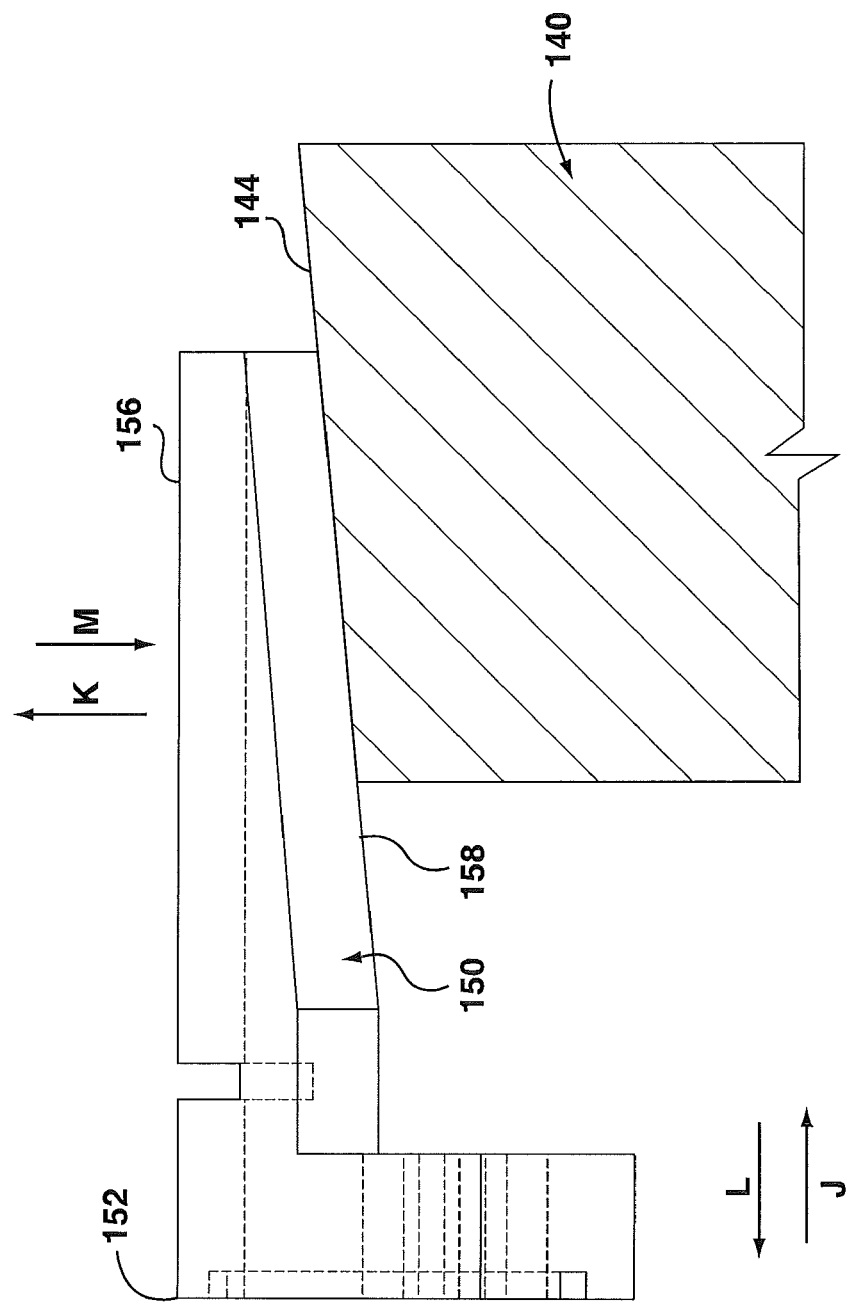
FIG. 9C is a cross-section showing the jaw segment of FIG. 9A engaging the inner surface of the ring portion, drawn at a larger scale.

The engagement of the external surface 156 of a single jaw segment 150 with the inner surface 144 as the jaw segment 150 is moved relative to the ring portion 140 is shown in FIG. 9C. When the insert portion 146 is moving from the first condition to the second condition, the jaw segment 150 is moving in the direction indicated by arrow "J" in FIG. 9C. Due to the taper of the external surface 156 and the shape of the inner surface 144 of the ring portion 140, as the insert portion 146 is moved in the direction of arrow "J", the jaw segment 150 is also moved inwardly, i.e., in the direction indicated by arrow "K" in FIG. 9C, because the jaw segment 150 is urged inwardly as the inner surface 144 is engaged by the external surface 158.

In one embodiment, the inner surface 144 substantially defines an offset profile which is offset outwardly from the design outer profile 138 substantially by the thickness of each jaw segment 150. However, it will be understood that many different arrangements are possible, and the inner surface 144 may have any suitable shape, depending in part on the form of the jaw segments.

It will be understood that the workpiece 132 and a number of elements in the tool assembly 130 are omitted from FIG. 9C, to simplify the drawing. For instance, it will be understood that the back end 152 of the jaw segment 150 is engaged with the back plate 148 (not shown in FIG. 9C).

After the housing 136 has been formed, the insert portion 146 is moved from the second condition to the first condition, i.e., the insert portion 146 is moved in the direction indicated by arrow "L" in FIG. 9C relative to the ring portion 140. Due to the tapered shape of the jaw segment 150, movement of the insert portion 146 to the first condition also causes movement of the jaw segment 150 outwardly, i.e., in the direction indicated by arrow "M" in FIG. 9C.

It will be understood that, once the housing is formed (i.e., as shown in FIG. 5), the jaw segments are moved to the second (disengaged) condition, and the housing is then removed, usually with the brick and the mat therein. Preferably, the jaw segments are moved from the second condition to the first condition due to the insert portion 146 moving from the closed condition to the open condition. After the housing 136 is removed, the next workpiece 132 (usually, with the brick and the mat positioned therein) is then positioned in the jaw segments while the jaw segments are in the disengaged condition.

Figure 6C:
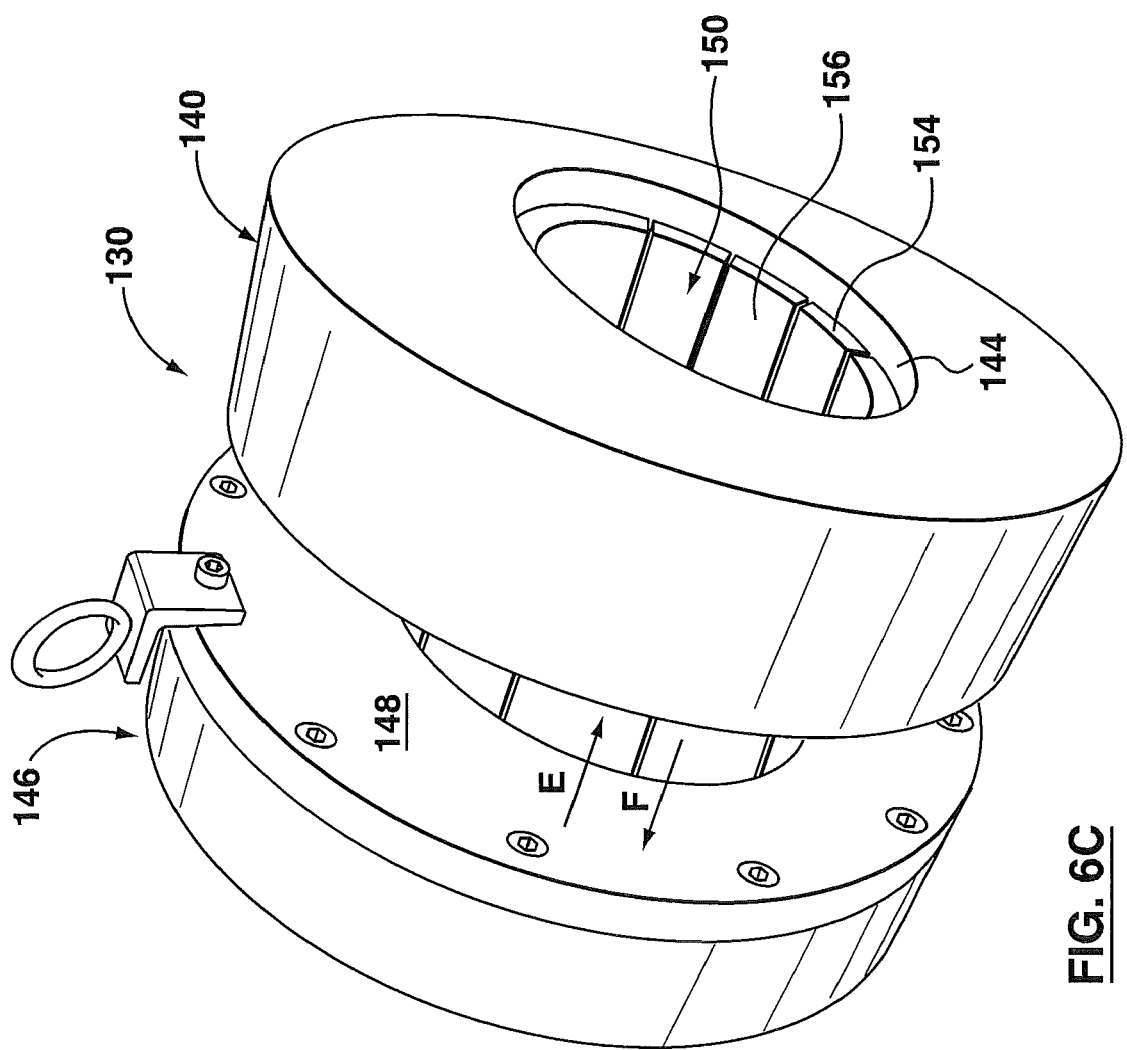
FIG. 6C is an isometric view of an embodiment of the tool assembly of the invention.
Figure 6D:
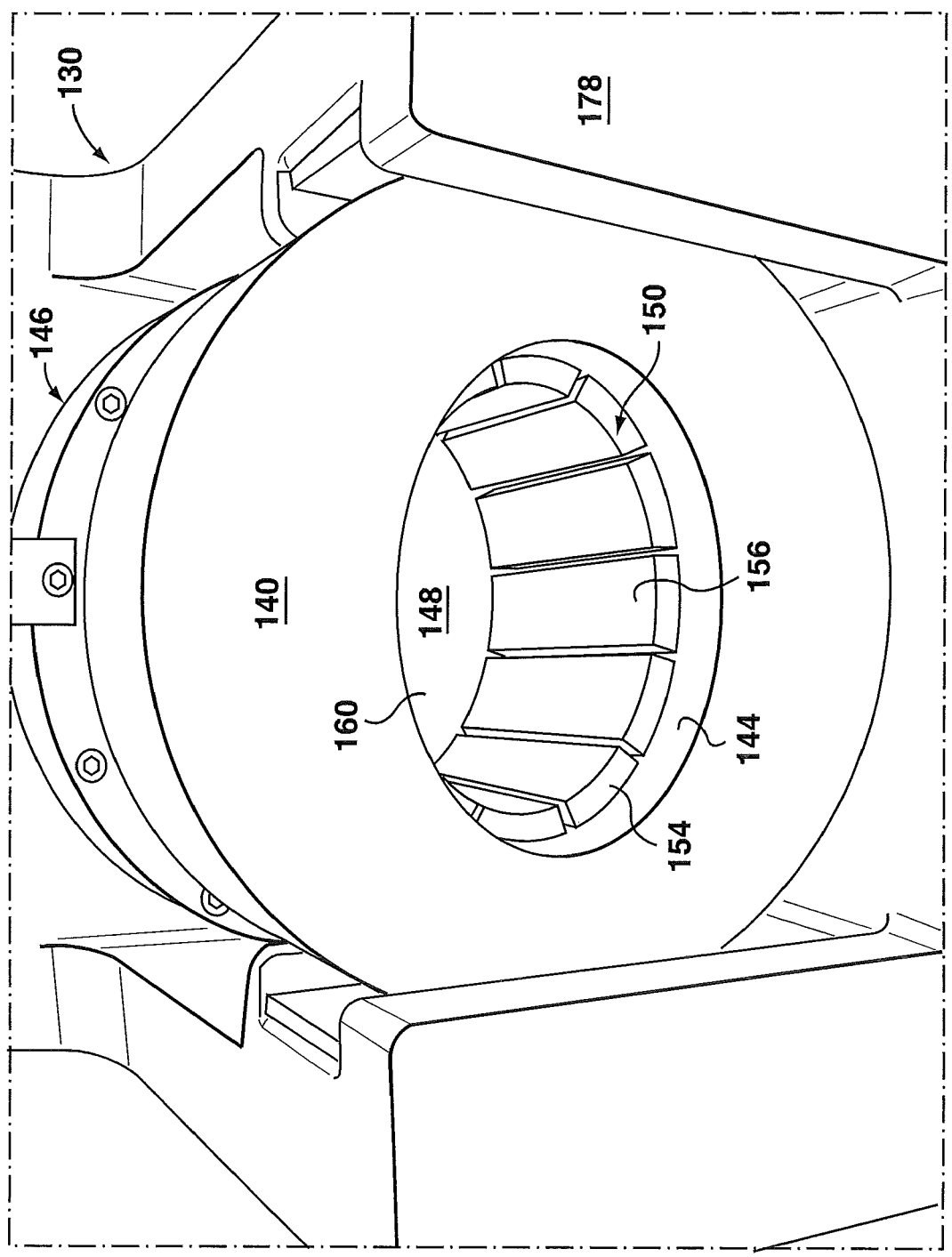
FIG. 6D is another isometric view of the tool assembly of FIG. 6C.
Figure 6F:
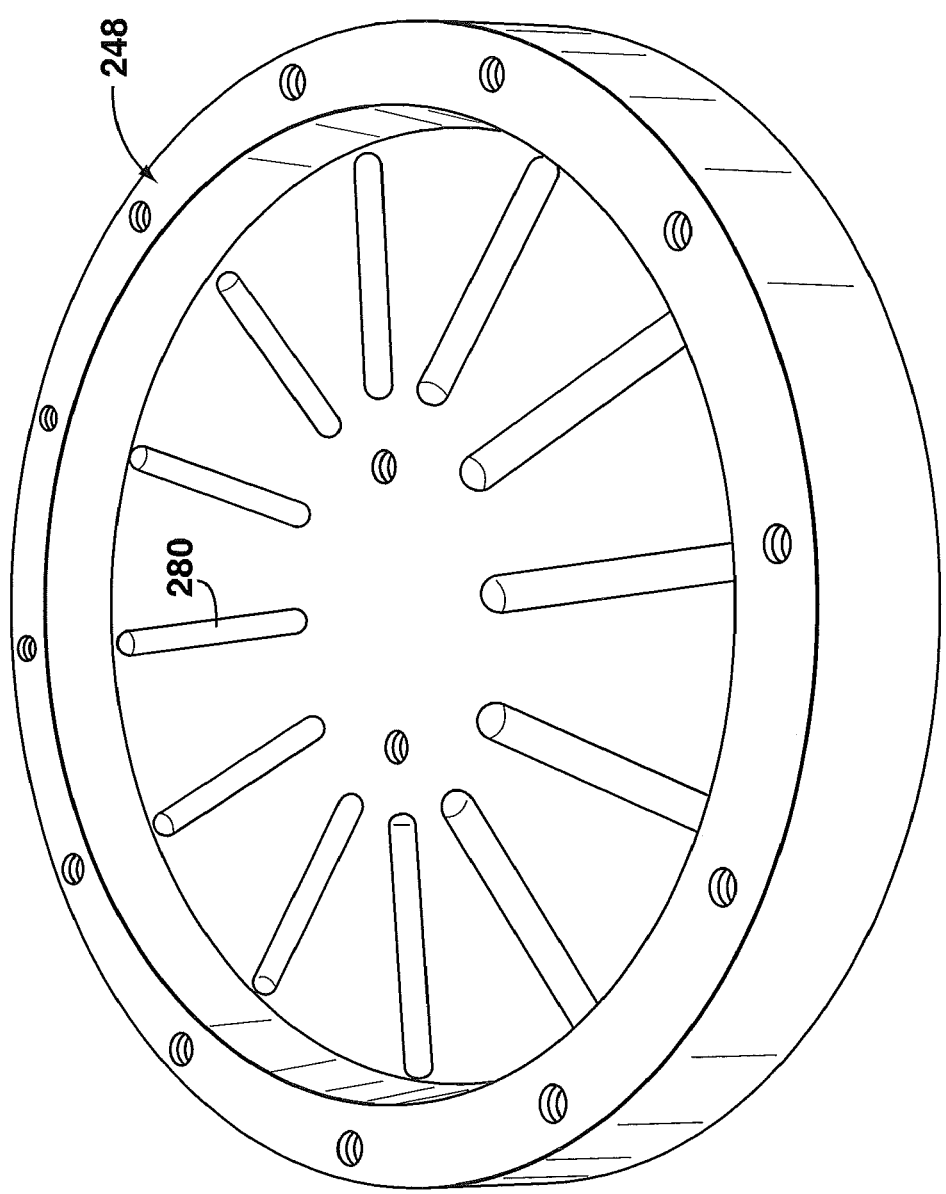
FIG. 6F is an isometric view of an alternative embodiment of a back plate of the invention, drawn at a larger scale.

As shown in FIG. 6C, when it is intended to cause the jaw segments to move from the first condition to the second condition, the insert portion 146 preferably is moved toward the ring portion 140, i.e., in the direction indicated by arrow "E" in FIG. 6C. When the jaw segments are to be moved from the second condition to the first condition, the insert portion 146 is moved away from the ring portion 140, i.e., in the direction indicated by arrow "F" in FIG. 6C. (It will be understood that the frame 178 is not included in FIG. 6C for clarity of illustration.)

Although the insert portion 146 has been described as being movable relative to the ring portion 140, it will be understood that other arrangements are possible. For example, in an alternative arrangement, the ring portion 140 may be movable relative to the insert portion 146, i.e., with the insert portion 146 remaining stationary. Alternatively, both the insert portion 146 and the ring portion 140 may be movable, i.e., each may be movable relative to the other.

For clarity of illustration, only a completed housing 136 is shown in FIG. 4 as being engaged by the jaw segments 150, in the engaged condition, i.e., the brick 174 and the mat 176 are not shown in FIG. 4 for clarity. FIG. 5 shows the housing 136 as formed with the brick 174 and the mat 176 therein, with the jaw segments 150 in the engaged condition.

For exemplary purposes, the non-round design profile shown in the drawings is an oval. However, it will be understood that the invention may be used to form a housing having any non-round shape, whether regular or irregular. Depending on the size of the housing and the size reduction required, the number of jaw segments may be greater or less than shown in the attached drawings. Also, the arrangement of the jaw segments into groups (each with a common focus) is dependent on, among other things, the design outer profile and the extent of the size reduction required.

INDUSTRIAL APPLICABILITY

Figure 15A:
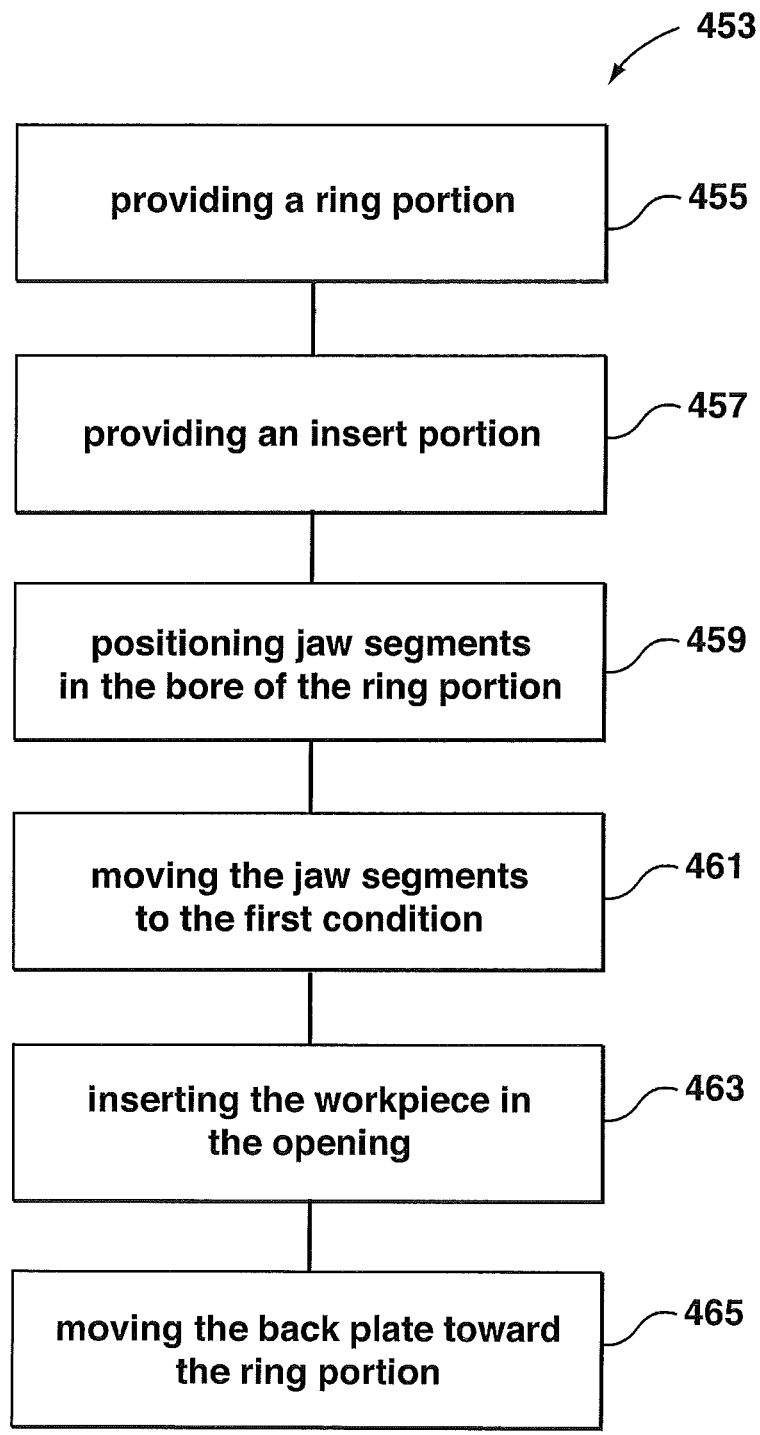
FIG. 15A is a schematic illustration of an embodiment of a method of the invention.

In use, an embodiment of a method 453 of the invention includes the steps of providing a ring portion (step 455, in FIG. 15A) and providing an insert portion (step 457). (It will be understood that the order in which steps 455 and 457 are performed may vary.) The jaw segments 150 are at least partially positioned in the bore 142 of the ring portion 140 (step 459). The jaw segments 150 preferably are moved to the first condition (step 461). The workpiece 132 is inserted in the opening 160 (step 463). Preferably, the back plate 148 is then moved toward the ring portion 140, causing the jaw segments 150 to engage substantially all of the outer surface 135 of the workpiece 132 and reduce the outer surface from the initial position thereof to the design position (step 465).

Figure 15B:
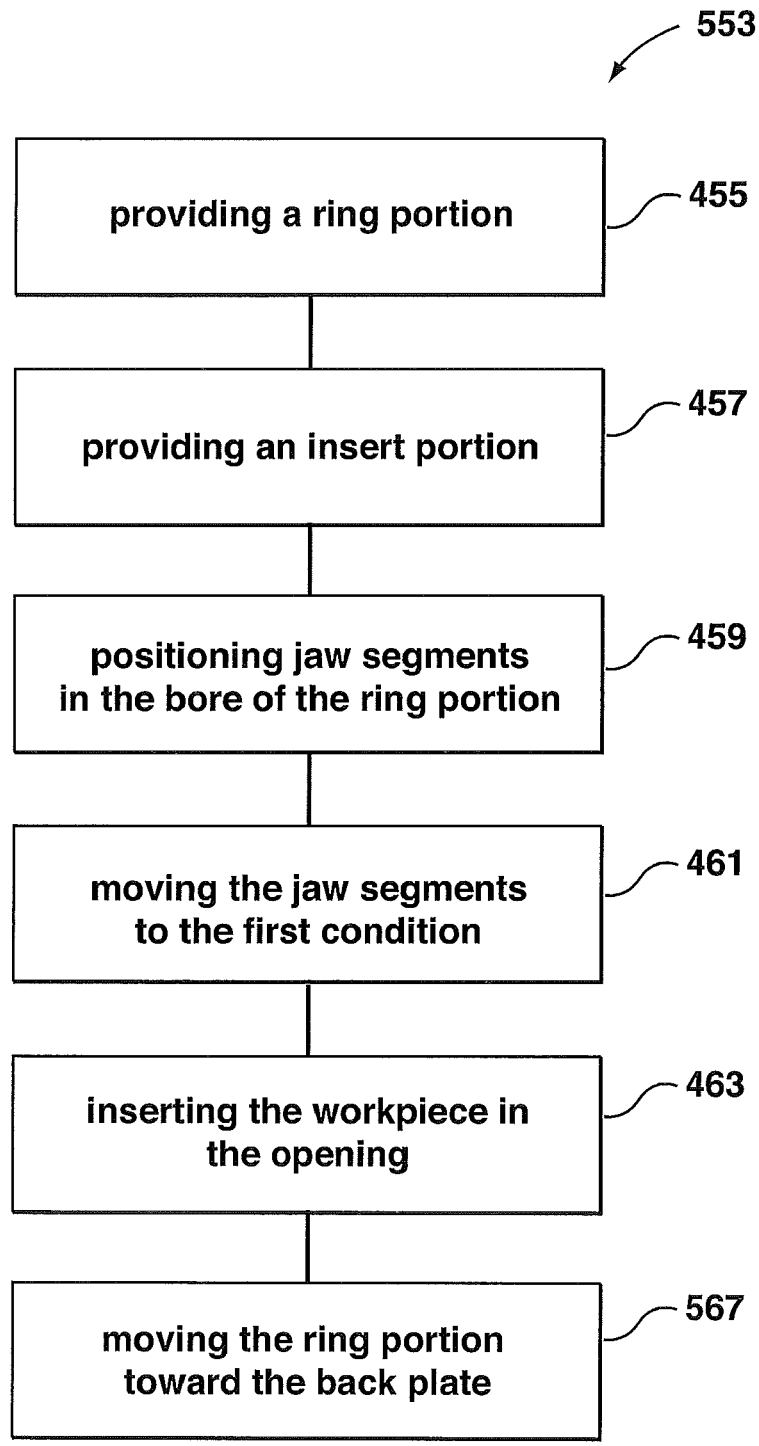
FIG. 15B is a schematic illustration of another embodiment of the method of the invention.
Figure 15C:
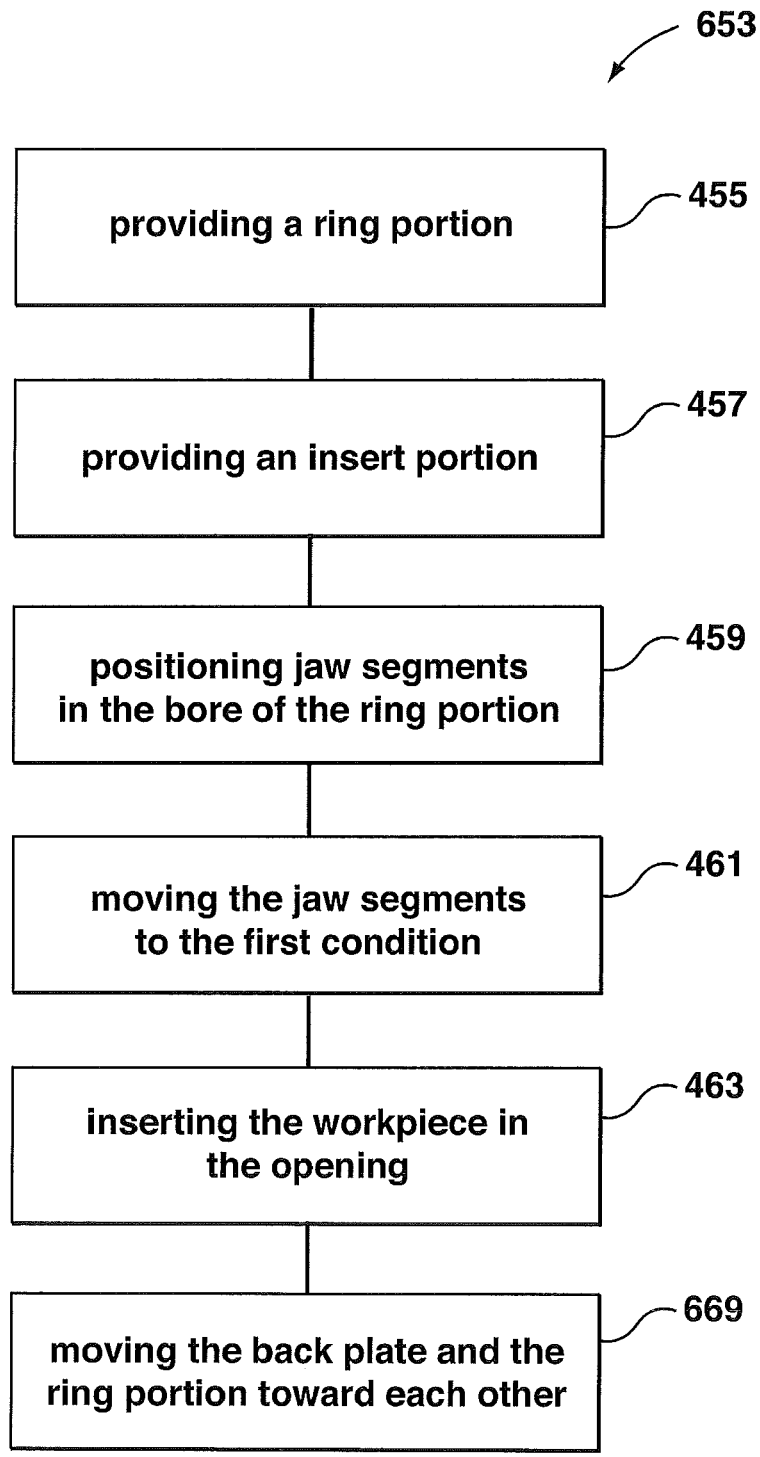
FIG. 15C is a schematic illustration of another alternative embodiment of the method of the invention.

An alternative embodiment of the method of the invention 553 is schematically illustrated in FIG. 15B. The method 553 is the same as the method 453, except that, instead of step 465, in the method 553, the ring portion 140 is moved toward the back plate 148 (step 567, in FIG. 15B). Another alternative embodiment of the method of the invention 653 is disclosed in FIG. 15C. The only difference between the method 653 and the other embodiments of the method 453, 553 is the final step. In the method 653, the final step involves moving the back plate 148 and the ring portion 140 toward each other (step 669, in FIG. 15C).

An additional embodiment of the invention is shown in FIGS. 6F, 6G, and 10A-14. In FIGS. 6F, 6G, and 10A-14, elements are numbered so as to correspond to like elements shown in FIGS. 2A-6E and 7A-9C.

As illustrated in FIGS. 10A-12B, in an alternative embodiment of the insert portion 246, the back plate 248 includes keyways 280. As can be seen, for example, in FIG. 12B, each jaw segment 250 preferably extends between a front end 254 and a back end 252, and includes a key portion 282 positioned at the back end 252. The key portion 282 is adapted to be slidably received in the keyway 280. The keyway 280 in the back plate 248 is for guiding each jaw segment 250 along the predetermined path therefor respectively. The keyway 280 for each respective jaw segment 250 preferably is aligned with the appropriate respective path for the jaw segment 250, to keep the jaw segment 250 properly aligned (i.e., moving along the predetermined path therefor) as the jaw segments are moved between the first condition and the second condition.

Figure 6G:
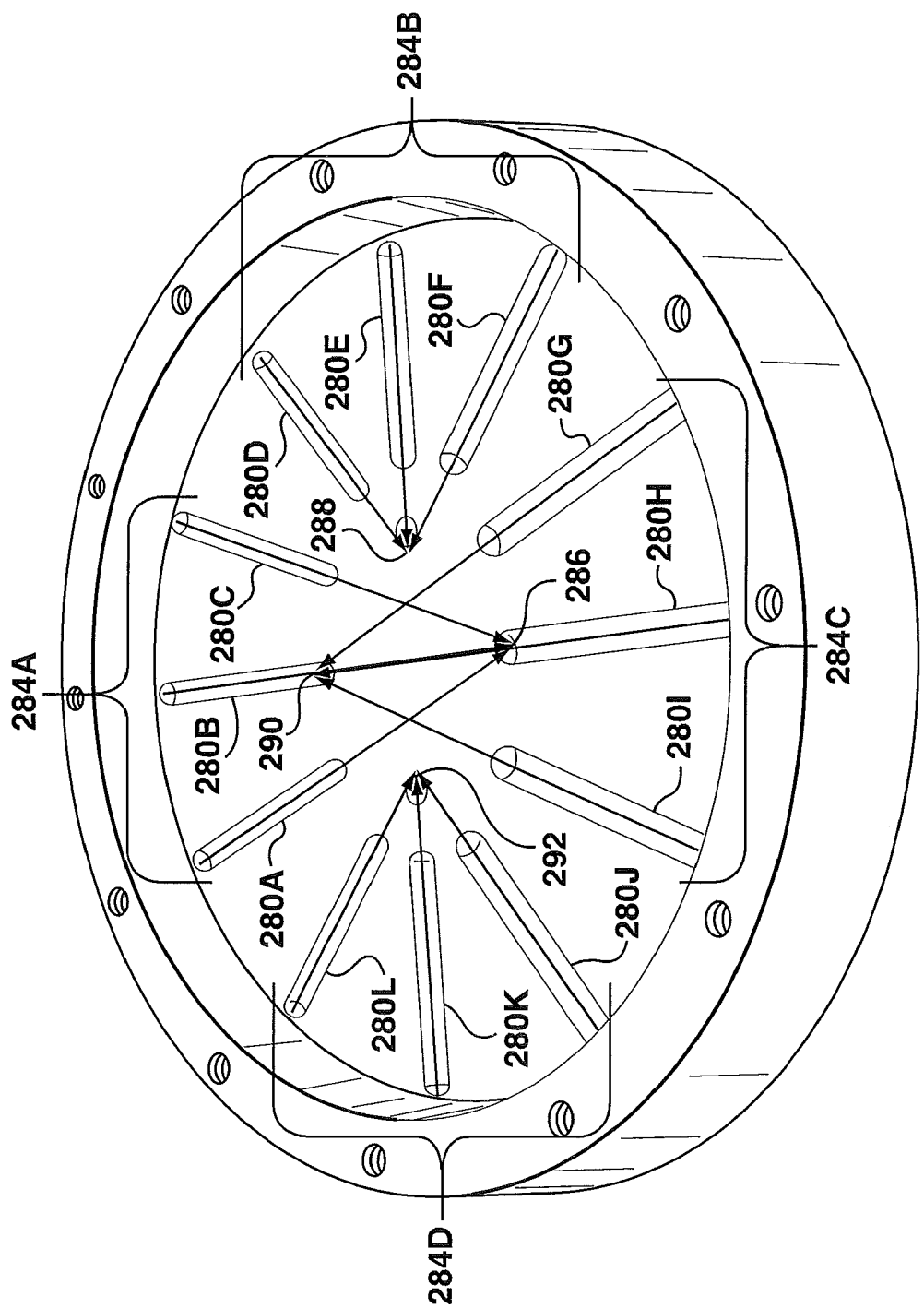
FIG. 6G is an isometric view of the back plate of FIG. 6F with direction of movement of the ring portion and/or the insert portion schematically represented therein.
Figure 7B:
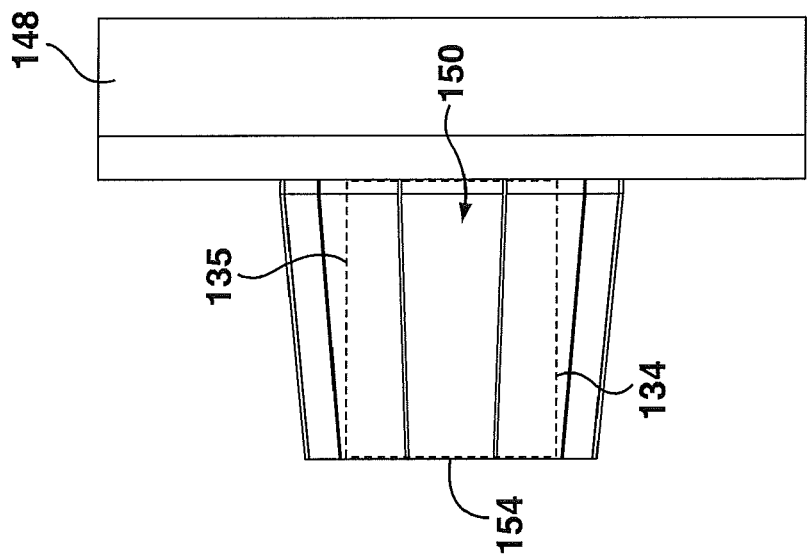
FIG. 7B is a side view of the insert portion of FIG. 7A.
Figure 7A:
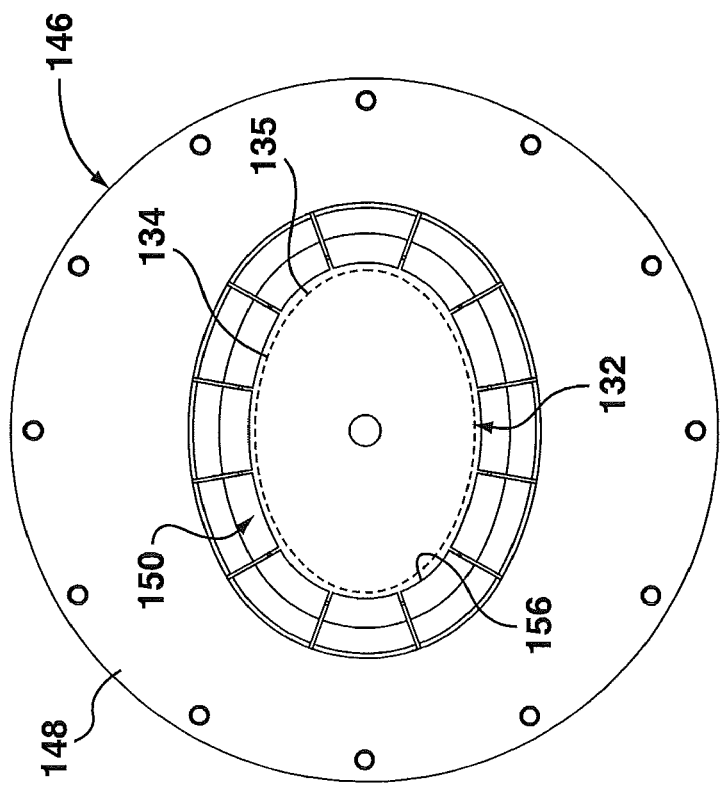
FIG. 7A is a front view of the insert portion of FIG. 6A, drawn at a smaller scale.

As can be seen in FIG. 6G, the keyways 280 are positioned so as to correspond to the directions of movement of the jaw segments respectively. In FIG. 6G, keyways 280A, 280B, and 280C are included in a group 284A with a common focus (preselected end point) 286. Keyways 280D, 280E, and 280F are included in a group 284B with a common focus (preselected end point) 288. Keyways 280G-280I are included in a group 284C with a common focus 290. Keyways 280J-280L are included in a group 284D with a common focus (preselected end point) 292.

Figure 13A:
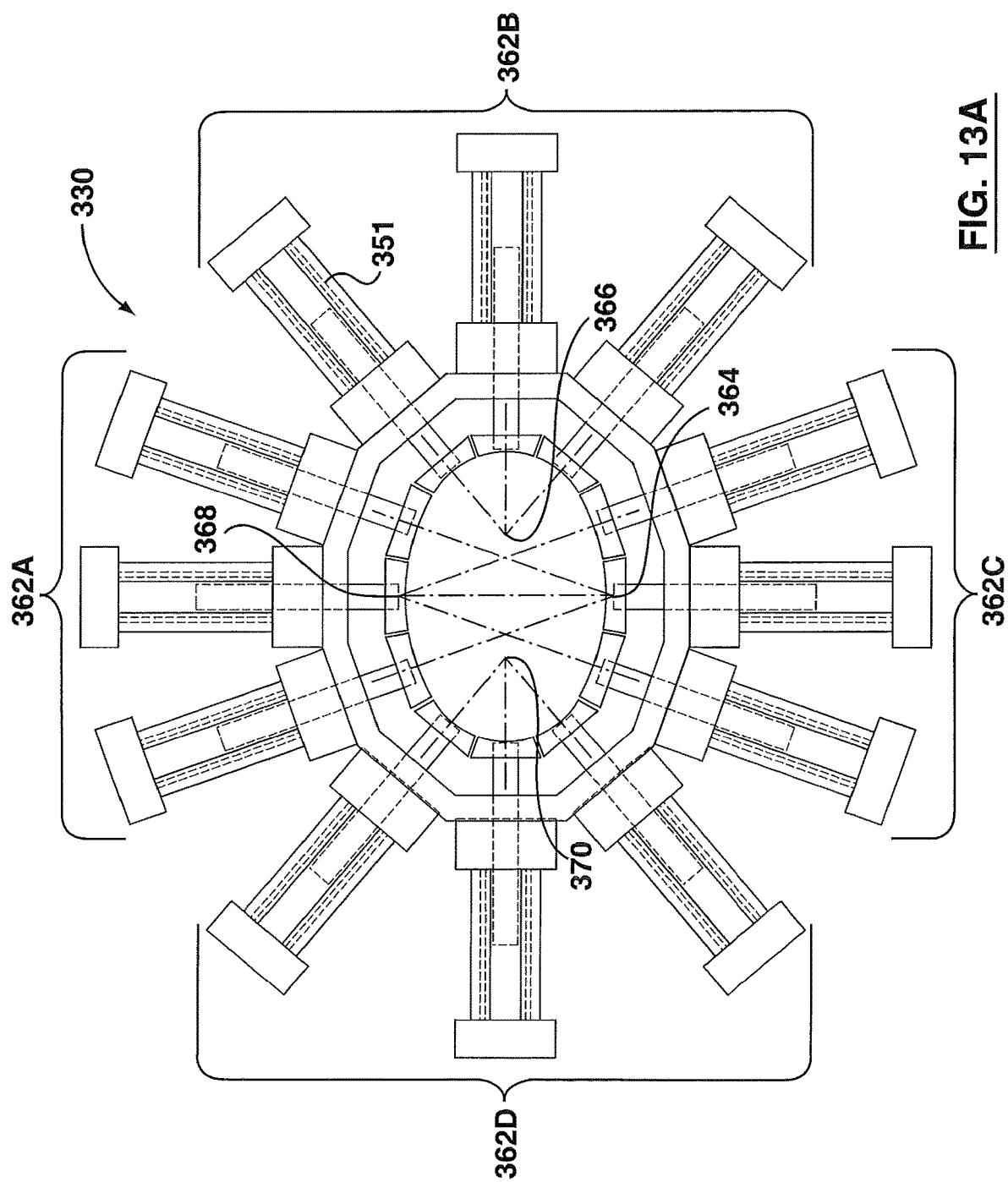
FIG. 13A is a front view of an alternative embodiment of the tool assembly of the invention in which the jaw segments are in the first condition.
Figure 14:
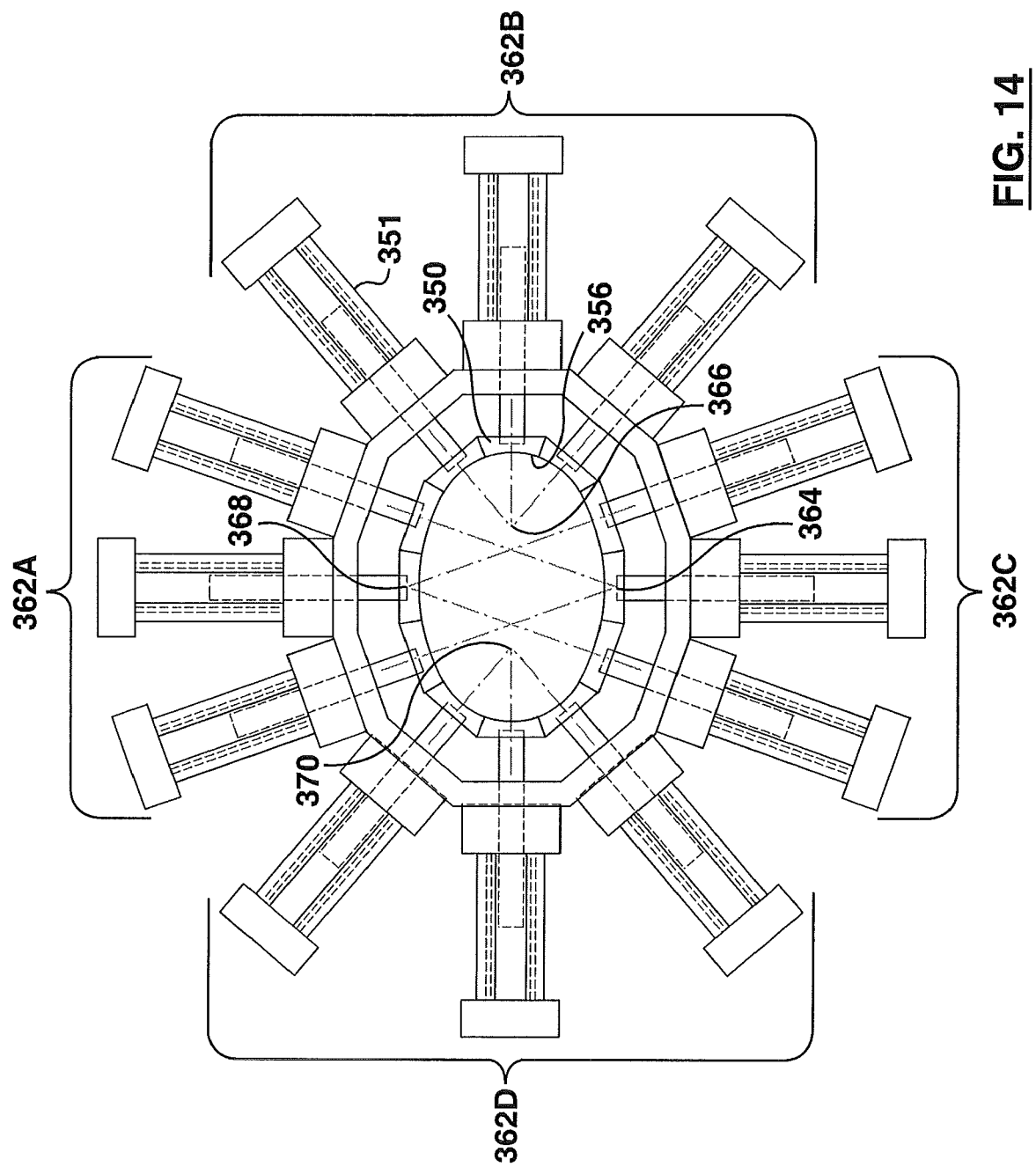
FIG. 14 is a front view of the tool assembly of FIG. 13A in which the jaw segments are in the second condition, drawn at a smaller scale.

It will be appreciated by those skilled in the art that various means for moving the jaw segments along predetermined paths (i.e., toward preselected end points) so that the workpiece is substantially simultaneously engaged by the jaw segments may be suitable. For instance, another embodiment of the tool assembly 330 of the invention is shown in FIGS. 13A, 13B and 14. The tool assembly 330 preferably includes a plurality of jaw segments 350 with respective internal surfaces 356. As can be seen in FIGS. 13A, 13B, and 14, the jaw segments 350 preferably are movable between a first condition (FIGS. 13A, 13B), in which an opening 360 is defined in which the workpiece 132 is receivable, and an second condition (FIG. 14), in which the internal surfaces 356 of the jaw segments 350 substantially define the design outer profile 138 of the housing 136. (For clarity of illustration, the workpiece 132 and the housing 136 formed from the workpiece 132 are not shown in FIGS. 13A, 13B, and 14.)

As can be seen in FIGS. 13A, 13B, and 14, each jaw segment 350 preferably is movable along a predetermined path toward a preselected end point (i.e., a predetermined focus) therefor. The jaw segments 350 preferably are also movable respectively along the predetermined path therefor, away from the end point, or predetermined focus thereof.

In one embodiment, and as shown in FIGS. 13A, 13B, and 14, each jaw segment 350 preferably is at least partially movable along the predetermined path therefor by one or more motive means 351. The motive means preferably is any suitable device. For instance, a hydraulic cylinder would be a suitable motive means. The hydraulic cylinders preferably are controlled so that engagement of the jaw segments 350 with the workpiece, to form the housing, is substantially simultaneous. Because of this, the workpiece 132 is formed into the housing 136 by the tool assembly 330, i.e., without seams or wrinkles.

For example, the design outer profile 138 for which the jaw segments 350 shown in FIGS. 13A, 13B and 14 are designed is an oval. As can be seen in FIGS. 13A, 13B, and 14, the jaw segments 350 are formed to be arranged in four groups of three jaw segments each. For convenience, the jaw segments are identified in FIG. 13B as jaw segments 350A-350L. As can be seen in FIGS. 13A and 13B, in this example, jaw segments 350A-350C are included in a group (designated 362A) of three jaw segments which travel along substantially straight paths directed to a common focus (preselected end point) 364. Similarly, the jaw segments 350D-350F are in a group 362B moving along paths directed toward a common focus (preselected end point) 366. The jaw segments 350G-350I are in a group 362C and are adapted to move along paths toward a common focus (preselected end point) 368. The jaw segments 350J-350L are in a group 362D adapted to move along paths towards a common focus 370.

As shown in FIGS. 13A, 13B, and 14, each jaw segment 350 moves along its respective substantially straight path, controlled by the motive means 351 associated with each jaw segment 350 respectively. For example, the jaw segment 350A moves along the path 372A toward the point 364 (i.e., in the direction indicated by arrow "G") when the jaw segments are moving from the first condition to the second condition. It will be understood that, when the jaw segments are moving from the second condition to the first condition, the jaw segment 350A moves along the path 372A in the opposite direction (i.e., in the direction indicated by arrow "H"), away from the common focus 364 (preselected end point).

The other jaw segments 350B, 350C in group 362A move along different paths (identified as 372B and 372C respectively in FIG. 13B). However, as shown in FIG. 13B, all three jaw segments 350A-350C move toward the same common focus (preselected end point) 364 when the jaw segments are moving from the first condition to the second condition, and all three jaw segments 350A-350C move away from the same common focus 364 when the jaw segments are moving from the second condition to the first condition. It can be seen from FIGS. 13A, 13B, and 14 that the jaw segments in the other groups 362B-362D also move along respective paths which are to or from each group's common focus respectively. The motive means 351, each of which preferably controls movement of the one jaw segment 350, provides precise control of such movement.

As indicated above, where the design outer profile is a non-round shape which is not an oval, different arrangements of jaw segments would be used, and the balance of the insert portion and the ring portion would also be modified as appropriate, depending on the design outer profile. In each case, selected jaw segments are moved to and from preselected end points, and also the engagement of the jaw segments with substantially the entire outer surface of the workpiece is substantially simultaneous.

It will be appreciated by those skilled in the art that the invention can take many forms, and that such forms are within the scope of the invention as claimed. For instance, other means for moving the jaw segments between the first and second conditions (e.g., ball screws, or various pneumatic or mechanical devices) may be used. The foregoing descriptions are exemplary, and their scope should not be limited to the preferred versions contained herein.

The invention claimed is:

1. A method of forming a workpiece with an outer profile at least partially defined by an outer surface thereof at an initial position into a housing with a non-round design outer profile at least partially defined by the outer surface at a design position reduced from the initial position thereof, the method comprising:
   (a) providing a plurality of jaw segments including a first group of jaw segments and a second group of jaw segments, each of said plurality of jaw segments having an internal surface for engaging the outer surface;
   each of said plurality of jaw segments being movable between a first condition, in which an opening is defined in which the workpiece is receivable, and a second condition, in which the internal surfaces of the plurality of jaw segments substantially define the design outer profile of the housing, each said internal surface defining a respective portion of the design outer profile;
   the first group of jaw segments associated with a preselected first end point defined by a first radius centered on the preselected first end point and substantially coincident with the portions of the design outer profile substantially defined by said internal surfaces of the first group of jaw segments;
   the second group of jaw segments associated with a preselected second end point defined by a second radius centered on the preselected second end point and substantially coincident with the portions of the design outer profile substantially defined by said internal surfaces of the second group of jaw segments, wherein the preselected first end point is spaced away from the preselected second end point;
   the first group of jaw segments each being movable along a predetermined path therefor, when moved from the first condition to the second condition, toward the preselected first end point, and when moved from the second condition to the first condition, away from the preselected first end point therefor;
   (b) moving the plurality of jaw segments to the first condition;
   (c) inserting the workpiece in the opening after said step (b);
   (d) moving the first group of jaw segments from the first condition to the second condition by moving the first group of jaw segments toward the preselected first end point; and
   (e) moving the second group of jaw segments from the first condition to the second condition by moving the second group of jaw segments toward the preselected second end point.

2. The method according to claim 1 wherein the preselected first end point is spaced from its associated internal surface by a first distance and wherein the preselected second end point is spaced from its associated internal surface by a second distance, wherein the first distance is larger than the second distance.

3. The method according to claim 2 wherein the non-round design is an oval.

4. The method of claim 1 wherein the plurality of jaw segments further includes a third group of jaw segments, the method further including the step of moving the third group of jaw segments toward a preselected third end point to move the third group of jaw segments from the first condition to the second condition, wherein the preselected third end point is spaced from the first end point and the second end point.

5. The method according to claim 4 wherein the workpiece is a catalytic converter.

6. A tool assembly for forming a catalytic converter with an outer profile at least partially defined by an outer surface thereof at an initial position into a housing with a non-round design outer profile at least partially defined by the outer surface at a design position reduced from the initial position thereof, the tool assembly comprising:
- a plurality of jaw segments including a first group of jaw segments and a second group of jaw segments, each said jaw segment having an internal surface for engaging the outer surface;
- said jaw segments being movable between a first condition, in which an opening is defined in which the workpiece is receivable, and a second condition, in which the internal surfaces of the jaw segments substantially define the design outer profile of the housing, each said internal surface defining a respective portion of the design outer profile;
- each said internal surface of the first group of jaw segments having a preselected first end point associated therewith defined by a first radius centered on the preselected first end point that is substantially coincident with the portion of the design outer profile defined by said internal surface;
- each said internal surface of the second group of jaw segments having a preselected second end point associated therewith defined by a second radius centered on the preselected second end point that is substantially coincident with the portion of the design outer profile defined by said internal surface, wherein the preselected first end point is spaced away from the preselected second end point; and
- each of the first group of jaw segments being movable along a predetermined path therefor, when moved from the first condition to the second condition, toward the preselected first end point, and when moved from the second condition to the first condition, away from the preselected first end point;
- each of the second group of jaw segments being movable along a predetermined path therefor, when moved from the first condition to the second condition, toward the preselected second end point, and when moved from the second condition to the first condition, away from the preselected second end point.

7. The tool assembly of claim 6 wherein the preselected first end point is spaced from its associated internal surface by a first distance and wherein the preselected second end point is spaced from its associated internal surface by a second distance, wherein the first distance is larger than the second distance.

8. The tool assembly of claim 6 wherein the plurality of jaw segments further includes a third group of jaw segments associated with a preselected third end point defined by a third radius centered on the preselected third end point and substantially coincident with the portions of the design outer profile substantially defined by said internal surfaces of the third group of jaw segments, wherein the preselected third end point is spaced away from the first and second preselected end points.

9. The tool assembly of claim 8 wherein the non-round design is an oval.

10. The tool assembly of claim 6 wherein the non-round design is an oval.

* * * * *